US008237969B2

(12) United States Patent

Kiriyama

(10) Patent No.: US 8,237,969 B2
(45) Date of Patent: Aug. 7, 2012

(54) FINISHER AND IMAGE FORMING SYSTEM

(75) Inventor: Tomohiro Kiriyama, Yamanashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 532 days.

(21) Appl. No.: 12/480,863

(22) Filed: Jun. 9, 2009

(65) Prior Publication Data

US 2009/0316196 A1 Dec. 24, 2009

(30) Foreign Application Priority Data

Jun. 18, 2008 (JP) ................................ 2008-159002

(51) Int. Cl.
*G06F 3/12* (2006.01)

(52) U.S. Cl. ........... 358/1.15; 358/1.5; 358/1.9; 358/1.1

(58) Field of Classification Search ........................ None
See application file for complete search history.

(56) References Cited

U.S. PATENT DOCUMENTS 6,196,959 B1 3/2001 Jörg et al.

FOREIGN PATENT DOCUMENTS

| | | | |
|---|---|---|---|
| JP | 5-327948 | A | 12/1993 |
| JP | 11-060030 | | 3/1999 |
| JP | 2000-512964 | T | 10/2000 |
| JP | 2002-283768 | | 10/2002 |

OTHER PUBLICATIONS

Notification of Reasons for Refusal issued in the corresponding Japanese Patent Application No. 2008-159002 dated May 25, 2010, and an English Translation thereof.

*Primary Examiner* — Twyler Haskins
*Assistant Examiner* — Helen Q Zong
(74) *Attorney, Agent, or Firm* — Buchanan Ingersoll & Rooney PC

(57) ABSTRACT

Disclosed is a finisher to perform finishing processing on a paper ejected from an image forming apparatus, including: a control section to switch an adjustment amount to be used in the finishing processing based on information of paper grain of the paper.

16 Claims, 27 Drawing Sheets

FIG. 8

T1

| PAPER SIZE | THEORETICAL VALUE OF MOVING AMOUNT[mm] |
|---|---|
| 5.5×8.5S | 10.5 |
| A5S | 14.0 |
| B5S | 16.0 |
| 16KS | 18.0 |
| A4S | 20.0 |
| A5L | 20.0 |
| 8.5×11S | 24.0 |
| 8.5×14S | 24.0 |
| 5.5×8.5L | 24.0 |
| B4S | 23.0 |
| B5L | 23.0 |
| 8KS | 23.0 |
| 16KL | 23.0 |
| 11×17S | 36.0 |
| 8.5×11L | 36.0 |
| A3S | 30.0 |
| A4L | 30.0 |

FIG.14

T2

| PAPER TYPE | BASIS WEIGHT | PAPER GRAIN | ADJUSTMENT AMOUNT[mm] |
|---|---|---|---|
| PLAIN PAPER | $64g/m^2$ - $90g/m^2$ | LONG GRAIN | +2.0 |
| | | SHORT GRAIN | ±0 |
| | $91g/m^2$ - $256g/m^2$ | LONG GRAIN | +0.8 |
| | | SHORT GRAIN | ±0 |
| HIGH QUALITY PAPER | $64g/m^2$ - $90g/m^2$ | LONG GRAIN | +2.5 |
| | | SHORT GRAIN | ±0 |
| | $128g/m^2$ - $256g/m^2$ | LONG GRAIN | +2.0 |
| | | SHORT GRAIN | ±0 |
| COLOR PAPER | $64g/m^2$ - $128g/m^2$ | LONG GRAIN | +2.1 |
| | | SHORT GRAIN | ±0 |
| | $128g/m^2$ - $256g/m^2$ | LONG GRAIN | ±0 |
| | | SHORT GRAIN | ±0 |
| COATED PAPER | $64g/m^2$ - $128g/m^2$ | LONG GRAIN | +1.0 |
| | | SHORT GRAIN | ±0 |
| | $128g/m^2$ - $256g/m^2$ | LONG GRAIN | ±0 |
| | | SHORT GRAIN | ±0 |
| RECYCLED PAPER | $64g/m^2$ - $90g/m^2$ | LONG GRAIN | +3.0 |
| | | SHORT GRAIN | ±1.5 |
| | $91g/m^2$ - $128g/m^2$ | LONG GRAIN | +2.2 |
| | | SHORT GRAIN | ±1.1 |
| | $129g/m^2$ - $256g/m^2$ | LONG GRAIN | +1.3 |
| | | SHORT GRAIN | ±0 |

*FIG.18*

T3

| PAPER GRAIN | CONVEYING PATTERN | FOLDING ROLLER ROTATION SPEED [rpm] | FOLDING KNIFE PUTTING TIME [ms] |
|---|---|---|---|
| SHORT GRAIN | PATTERN 1 | 400 → 1000 | 500 |
| LONG GRAIN | PATTERN 2 | 200 → 400 → 1000 | 800 |

*FIG.22*

T4

| PAPER GRAIN | NUMBER OF TIMES PASTE IS APPLIED [TIMES] |
|---|---|
| SHORT GRAIN | 1 |
| LONG GRAIN | 2 |

*FIG. 26*

T5

| PAPER GRAIN | BATCH TO BE CUT [SHEETS] | CURRENT VALUE WHEN CUTTING [A] |
|---|---|---|
| SHORT GRAIN | | 0.5 |
| LONG GRAIN | NOT 20 SHEETS OR MORE | 0.5 |
| | 20 SHEETS OR MORE | 0.75 |

FINISHER AND IMAGE FORMING SYSTEM

BACKGROUND

1. Field of the Invention

The present invention relates to a finisher and an image forming system.

2. Description of Related Art

Paper used in an image forming apparatus such as a copier, printer, etc., have paper grain.

Paper grain is a grain direction of paper and there is "long grain" and "short grain". The long grain is a paper grain in a grain direction parallel to a long edge of a paper length and perpendicular to a short edge. Also, the short grain is opposite of the long grain and is a paper grain in the grain direction perpendicular to the long edge of the paper length and parallel to the short edge.

Such information of the paper grain of the paper (hereinafter referred to as "paper grain information") is especially important to perform finishing with high accuracy. However, it is difficult for a user to discriminate at a glance the paper grain of the paper.

For example, Japanese Patent Application Laid-Open Publication No. H5-327948 discloses an image forming apparatus which stores paper grain information where a paper size and the paper grain is uniquely determined, and forms an image on the paper of the stored paper grain information as well as the object image. With this, the user can easily discriminate the paper grain by looking at the paper grain information formed as an image on the paper.

However, in the image forming apparatus of Japanese Patent Application Laid-Open Publication No. H5-327948, the paper grain information cannot be used for control of the finishing processing, and the finishing processing is performed uniformly with the same control regardless of whether the paper grain is long grain or short grain. Therefore, a result obtained after performing the finishing processing (hereinafter referred to as "finishing processing resulting product") varies in quality.

SUMMARY

In order to achieve at least one of the above-described objects, according to an aspect of the present invention, there is provided a finisher to perform finishing processing on a paper ejected from an image forming apparatus, including:

a control section to switch an adjustment amount to be used in the finishing processing based on information of paper grain of the paper.

According to another aspect of the present invention, there is provided an image forming system, including:

an image forming apparatus to form an image on paper; and a finisher to perform finishing processing on the paper ejected from the image forming apparatus, wherein the image forming apparatus includes an image forming section to form an image on the paper; and the finisher includes a control section to switch an adjustment amount to be used in the finishing processing according to a content of the finishing processing based on information of paper grain of the paper.

BRIEF DESCRIPTION OF THE DRAWINGS

The present invention will become more fully understood from the detailed description given hereinbelow and the appended drawings, and thus are not intended to define the limits of the present invention, and wherein;

FIG. 8 is a table showing a theoretical value of moving amount to a standby position and a paper size corresponded;

FIG. 14 is a table showing paper information and adjustment amount corresponded;

FIG. 18 is a table showing paper grain information and time necessary for folding processing corresponded;

FIG. 22 is a table showing the paper grain information and the number of times the paste is applied corresponded;

FIG. 26 is a table showing the paper grain information and the current value when cutting corresponded.

DETAILED DESCRIPTION OF PREFERRED EMBODIMENTS

A preferred embodiment reflecting an aspect of the present invention will be described in detail with reference to the drawings. However, the scope of the invention is not limited to the illustrated examples.

First, the structure is described.

Figure 1:
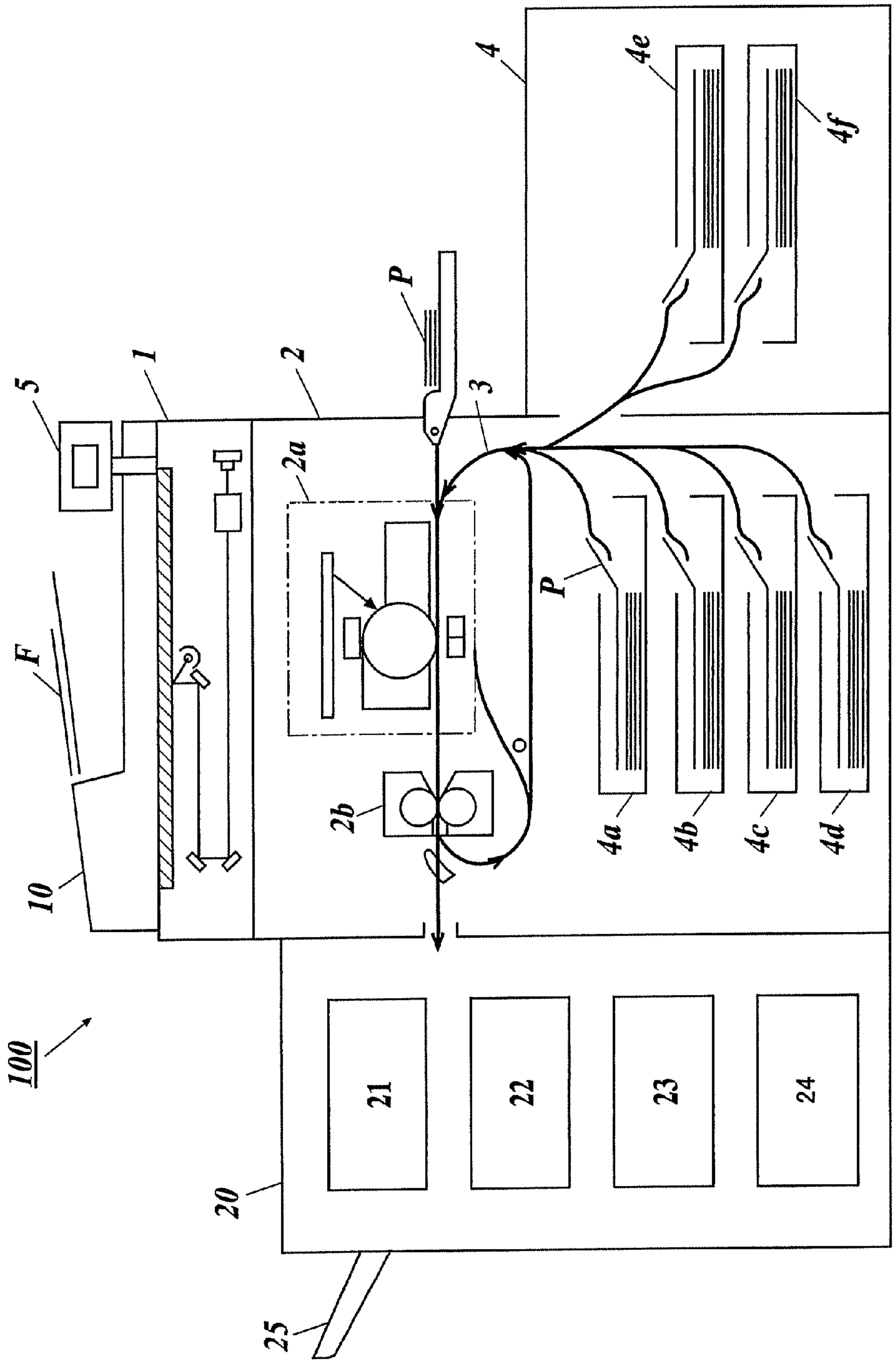
FIG. 1 is a schematic cross section view showing an image forming system.

FIG. 1 is a schematic cross section view showing an image forming system 100.

The image forming system 100 includes an image forming apparatus 10 and a finisher 20.

The image forming apparatus 10 includes a reading section 1, image forming section 2, conveying section 3, paper feeding tray 4, operation/display section 5, and the like.

The reading section 1 includes an optical system such as contact glass, platen glass, light source, mirror, light condensing lens, CCD, etc. The reading section 1 uses the above described optical system to convert an image of a document F placed on a tray for reading to an electrical signal and the converted electrical signal is output to the image forming section 2.

The image forming section 2 includes an image forming processing section 2*a*, heat fixing section 2*b* and the like.

The image forming processing section 2*a* includes a laser unit, photoreceptor, charging device, developing device, transferring device, separating device, cleaning device, and the like. The image forming processing section 2*a* uses the above described devices to transfer a toner image on a paper P. The heat fixing section 2*b* heat fixes the toner image transferred on the paper P by heat and pressure.

The conveying section 3 includes a conveying path, switching hook, reverse roller, etc. The conveying path conveys the paper P to the image forming processing section 2*a* and heat fixing section 2*b* and then conveys the paper P to the finisher 20. Also, the switching hook switches the conveying path of the paper P to be conveyed. Also, the reverse roller reverses a front face and rear face of the paper P to be conveyed.

The paper feeding tray 4 includes a plurality of paper feeding trays 4*a*, to 4*f*.

The paper feeding tray 4 accommodates a plurality of different types of paper P in each paper feeding tray, and supplies the paper P to the image forming section 2 through the conveying section 3.

The operation/display section 5 includes an LCD (Liquid Crystal Display), touch panel, etc., and displays various setting screens to receive various settings input by the user.

The various setting screens displayed by the operation/display section 5 includes, for example, setting screen of paper P stored in the paper feeding tray 4.

Figure 2:
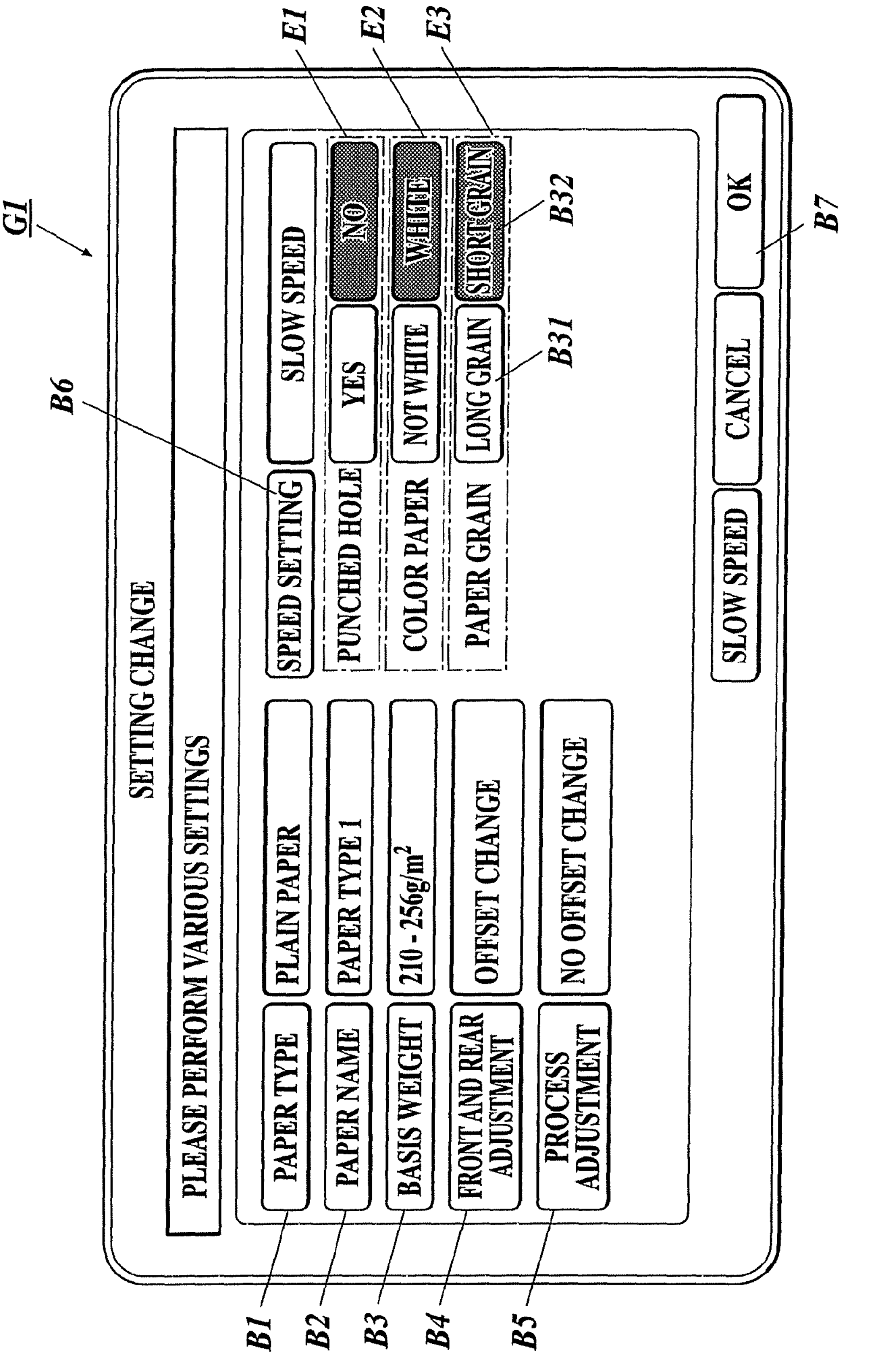
FIG. 2 is a diagram showing an example of a setting screen of a paper feeding tray.

FIG. 2 is a diagram showing the setting screen G1 of the paper P stored in the paper feeding tray 4.

Incidentally, the setting screen G1 shown in FIG. 2 is a setting screen displaying each paper feeding tray 4 (4*a* to 4*f*). The user inputs the setting information (hereinafter referred to as "paper information") of the paper P on the setting screen G1 for each paper feeding tray 4. The input paper information is stored in the later described storage section.

The setting screen G1 displays a paper type setting button B1, paper name setting button B2, basis weight setting button B3, front and rear adjusting button B4, process adjusting button B5, speed setting button B6, OK button B7, punched hole setting area E1, color paper setting area E2, paper grain setting area E3, etc.

Here, the paper grain setting area E3 includes a long grain button B31 to receive setting of the long grain and short grain button B32 to receive setting of short grain as paper grain of paper P. The paper grain (long grain or short grain) information of the paper P selected in the paper grain setting area E3 is stored in the later described storage section as paper grain information.

The finisher 20 includes a punching processing section 21, folding processing section 22, paste applying processing section 23, cutting processing section 24, etc. Also, the finisher 20 includes a paper ejecting tray 25 to eject the paper P after performing the various finishing processing.

The punching processing section 21 includes a punching unit. The punching processing section 21 temporarily stops the paper P conveyed from the image forming apparatus 10 to perform processing of opening a punched hole in an edge section of the paper P with the punching unit.

The folding processing section 22 includes a folding roller, folding knife, etc., to perform folding processing on a batch of paper P conveyed from the image forming apparatus 10. As the folding processing, there are center folding processing where the center section of the paper P in the conveying direction is folded, processing of folding in three, processing of Z fold, etc.

The paste applying processing section 23 includes a pasting roller and performs paste applying on the paper P conveyed from the image forming apparatus 10. The folding processing can also be performed when the paste is applied.

The cutting processing section 24 performs cutting of the paper P conveyed from the image forming apparatus 10. The cutting processing section 24 raises and lowers the current value when cutting to adjust the level of power when cutting.

Figure 3:
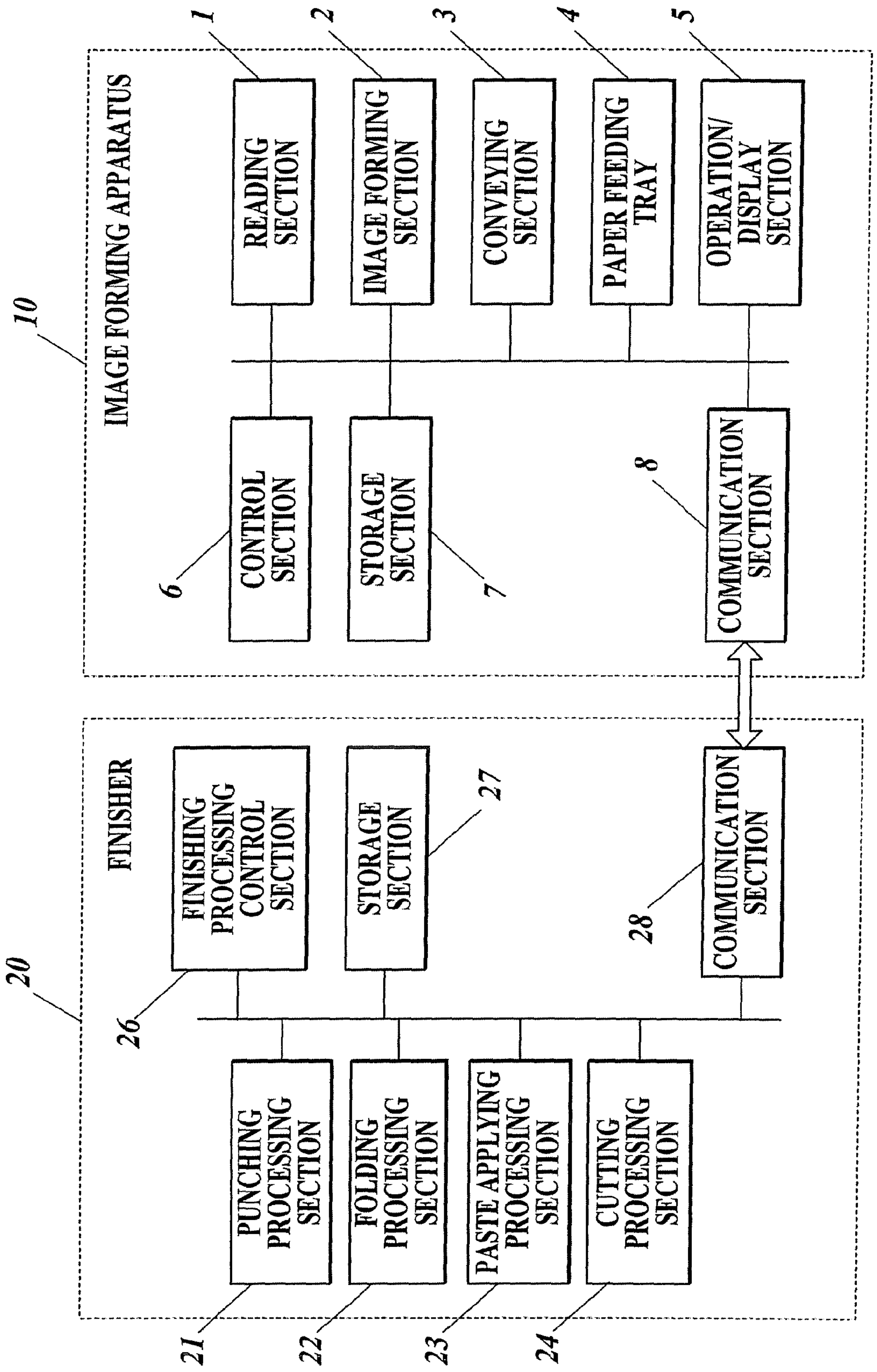
FIG. 3 is a control block diagram showing the image forming system.

FIG. 3 is a control block diagram showing the image forming system 100.

The image forming apparatus 10 includes a reading section 1, an image forming section 2, a conveying section 3, a paper feeding tray 4, an operation/display section 5, control section 6, storage section 7, communication section 8, and the like.

Incidentally, the same reference numeral is applied to a structure similar to the sections shown in FIG. 1, and the description is omitted here.

The control section 6 includes a Central Processing Unit (CPU), ROM, RAM and the like.

The control section 6 reads out the program stored in the ROM and expands the program to the RAM, and in coordination with the expanded program, the control section 6 centrally controls the various processing and the sections of the image forming apparatus 10.

For example, the control section 6 corresponds the paper grain information input on the setting screen G1 (see FIG. 2) to each paper feeding tray 4 and stores the information to the storage section 7.

Also, the control section 6 feeds the paper P suitable for the finishing processing from any one of the paper feeding trays 4 according to the content of the finishing processing performed by the finisher 20, paper grain information, etc.

The storage section 7 includes an electrically erasable and rewritable nonvolatile storage medium composed of a magnetic or optical storage medium or a semiconductor memory.

Also, the storage section 7 stores the paper grain information corresponding to each paper feeding tray 4.

The communication section 8 includes a modem, Terminal Adapter (TA), router and the like.

The communication section 8 performs communication with the finisher 20 by sending paper grain information of the paper P conveyed to the finisher 20 and instruction information instructing finishing processing and also receiving various pieces of information sent from the finisher 20.

The finisher 20 includes a punching processing section 21, folding processing section 22, paste applying processing section 23, cutting processing section 24, finishing processing control section 26, storage section 27, communication section 28, etc.

Incidentally, the same reference numeral is applied to a structure similar to the sections shown in FIG. 1, and the description is omitted here.

The finishing processing control section 26 includes a CPU, ROM, RAM and the like.

The finishing processing control section 26 performs predetermined finishing processing on the paper P by controlling the driving of each section based on the program stored in the ROM and ejects the finishing processing resulting product to the paper ejecting tray 25.

The storage section 27 stores the various programs to perform control of each section of the finisher 20.

Also, the storage section 27 stores various tables (see FIG. 8, FIG. 14, etc.) when performing the finishing processing. Described in detail later, the various tables include adjustment amount, etc. when finishing processing is performed based on the paper grain information.

The communication section 28 includes a modem, TA, router, and the like and performs communication with the image forming apparatus 10.

Next, the operation is described.

Figure 4:
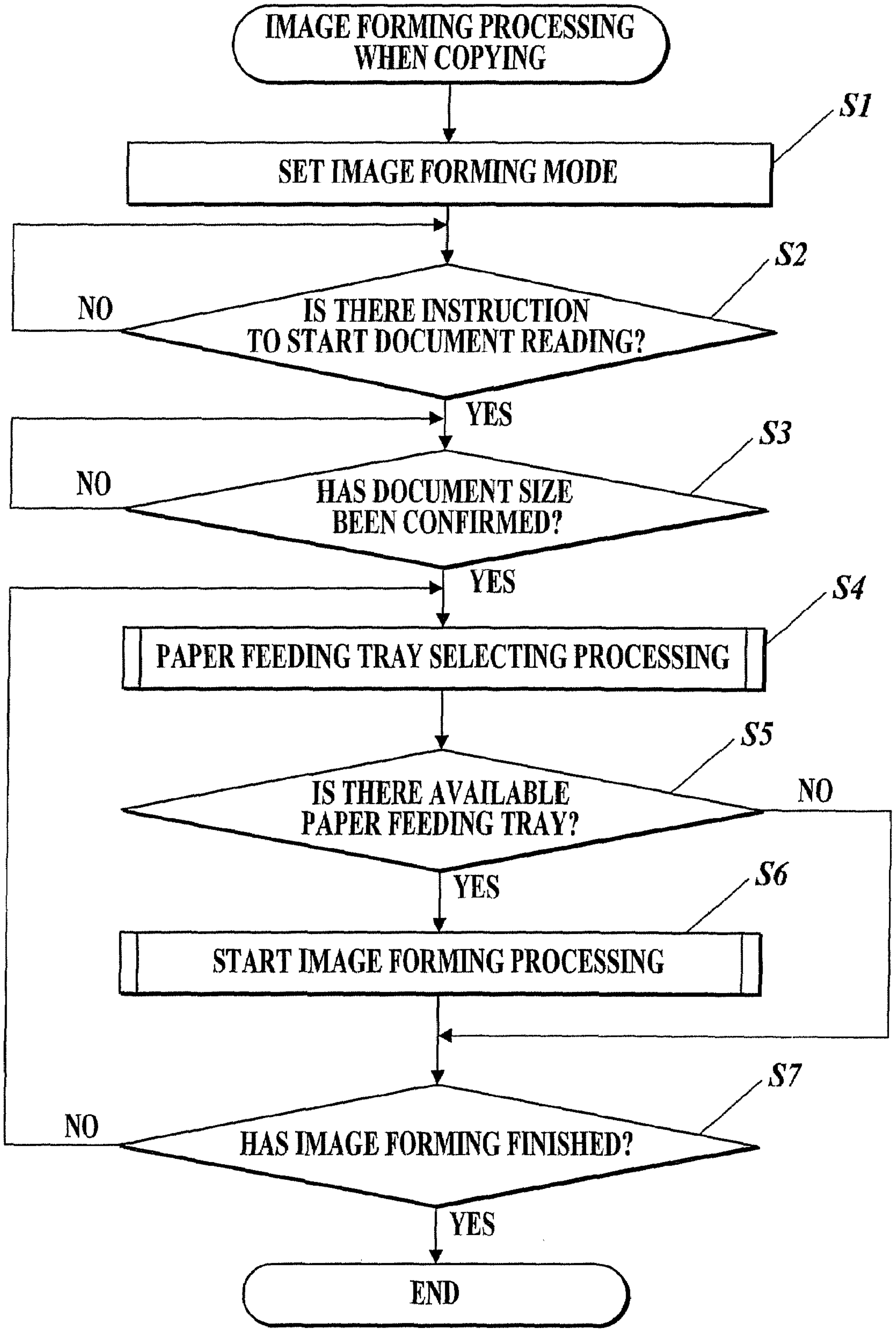
FIG. 4 is a flow diagram showing an image forming processing when copying.

FIG. 4 is a diagram showing the image forming processing when copying.

The control section 6 receives a setting of an image forming mode according to an instruction input from the operation/display section 5, external apparatus, etc. (step S1).

The image forming mode is a mode when an image is formed on the paper P and as its setting, there are, for example, setting of paper size, setting of paper grain information of paper P used in the finishing processing, setting of double face printing, setting of enlarging/reducing, etc.

The control section 6 temporarily stores the received setting of the image forming mode in the RAM, etc.

The control section 6 judges whether or not there is an instruction from the operation/display section 5, the external apparatus, etc. to start reading of the document F placed on the reading section 1 (step S2).

When there is no instruction to start reading (step S2; N), the control section 6 standbys until there is an instruction. When there is an instruction to start reading (step S2; Y), the control section 6 judges whether or not the size of the document F has been confirmed (step S3).

When the size of the document F has not been confirmed (step S3; N), the control section 6 judges again whether or not the size of the document F has been confirmed.

When the size of the document F has been confirmed (step S3; Y), the control section 6 performs the paper feeding tray selecting processing (step S4).

Figure 5:
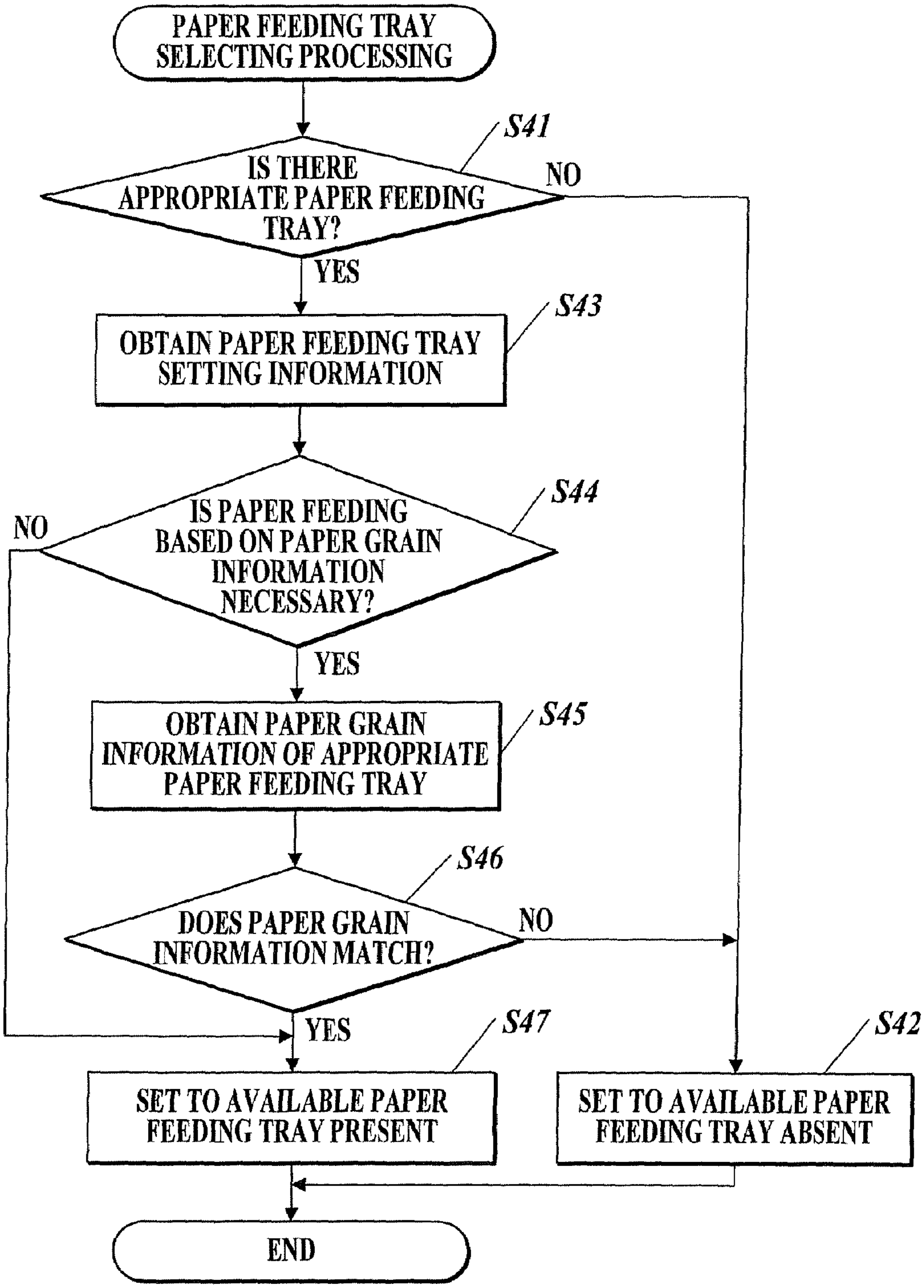
FIG. 5 is a flow diagram showing a paper feeding tray selecting processing.

FIG. 5 is a diagram showing the paper feeding tray selecting processing.

In the paper feeding tray selecting processing, the paper feeding tray 4 storing the paper P with the size set in step S1 is selected. Also, in addition, the paper feeding tray 4 storing the paper P with the suitable paper grain is selected.

The control section 6 judges whether or not there is a paper feeding tray 4 storing the paper P with the size set in step S1 (step S41). Incidentally, the information of the paper size stored in each paper feeding tray 4 is stored in advance in the storage section 7.

When there is no appropriate paper feeding tray 4 (step S41; N), the control section 6 generates available paper feeding tray presence information set with available paper feeding tray absent and stores the information in the storage section 7 (step S42) and ends the paper feeding tray selecting processing.

When there is an appropriate paper feeding tray 4 (step S41; Y), the control section 6 obtains paper information (see FIG. 2) (step S43).

The control section 6 judges whether or not the paper grain information is set with the obtained paper information. In other words, the control section 6 judges whether or not the paper feeding processing based on the paper grain information needs to be performed (step S44).

When there is no need to perform the paper feeding processing based on the paper grain information (step S44; N), the control section 6 advances the processing to step S47.

When the paper feeding processing based on the paper grain information needs to be performed (Step S44; Y), the control section 6 obtains the paper grain information of the paper feeding tray 4 judged to be appropriate in step S41 (step S45).

The control section 6 judges whether or not the obtained paper grain information matches the paper grain information of the paper P used in the finishing processing set in step S1 (step S46).

When the pieces of information do not match (step S46; N), in other words, when there is no paper P with the suitable paper grain in the paper feeding tray 4 judged to be appropriate in step S41, the control section 6 advances the processing to step S42.

When the pieces of information match (step S46; Y), in other words, when there is paper P with the suitable paper grain in the paper feeding tray 4 judged to be appropriate in step S41, the control section 6 generates available paper feeding tray presence information set with available paper feeding tray present and stores the information in the storage section 7 (step S47) and ends the paper feeding tray selecting processing.

Returning to FIG. 4, the control section 6 judges whether or not there is an available paper feeding tray based on the available paper feeding tray presence information (step S5).

When there is no available paper feeding tray (step S5; N), the control section 6 advances the processing to step S7.

When there is an available paper feeding tray (step S5; Y), the control section 6 starts the image forming processing (step S6).

Incidentally, when finishing processing is performed on the paper P with the image formed, the control section 6 conveys the paper P with the image formed to the finisher 20 and also sends instruction information of the finishing processing. The finishing processing of the image forming processing will be described later.

The control section 6 judges whether or not the image forming processing has finished (step S7).

When the image forming processing has not finished (step S7; N), the control section 6 advances the processing to step S4.

When the image forming processing has finished (step S7; Y), the image forming processing when copying ends.

Figure 6:
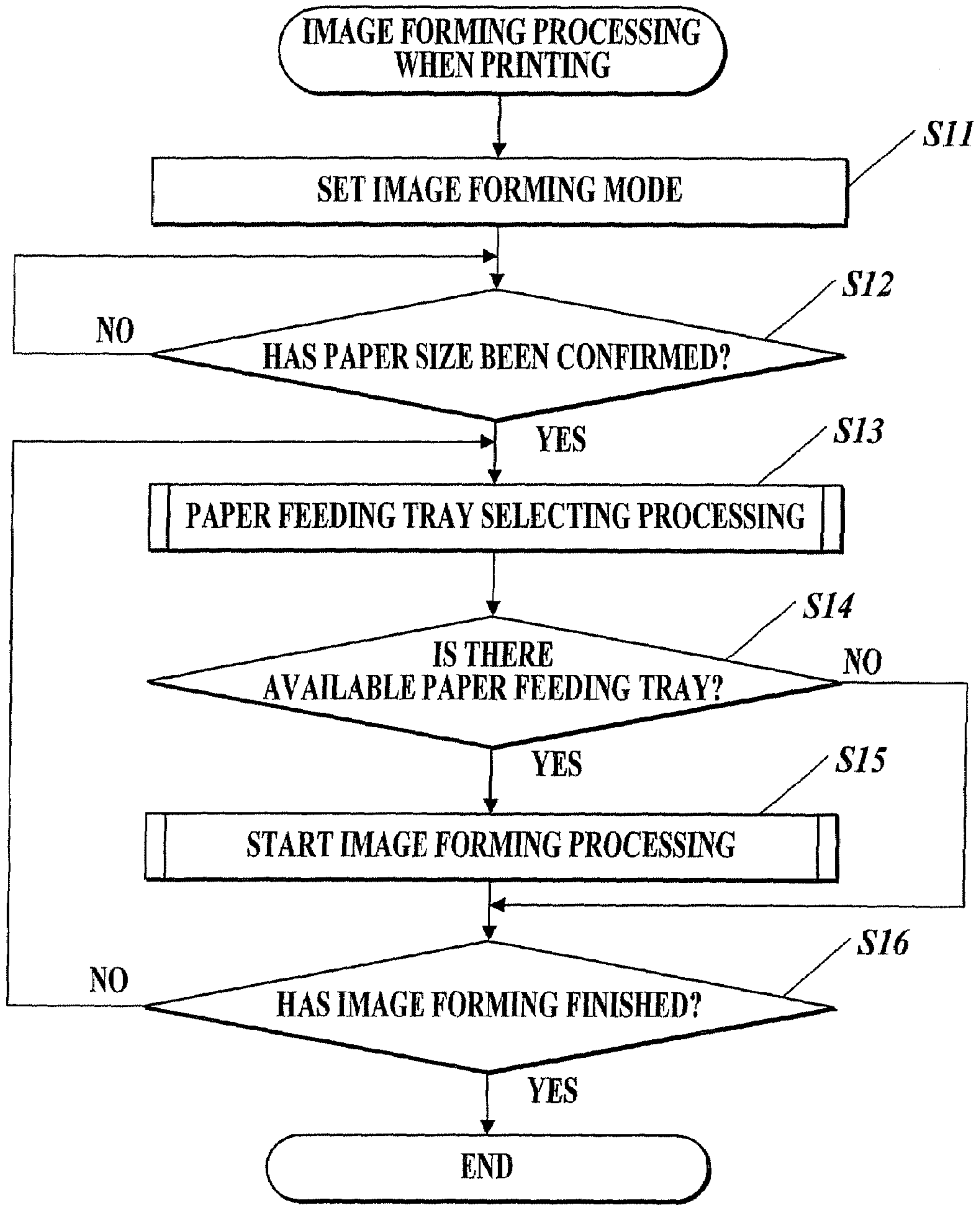
FIG. 6 is a flow diagram showing an image forming processing when printing.

FIG. 6 is a diagram showing image forming processing when printing.

The control section 6 receives setting of image forming mode according to an instruction input from the operation/display section 5, external apparatus, etc. (step S11).

The control section 6 judges whether or not the paper size of the paper P in the paper feeding tray 4 has been confirmed by the operation/display section 5, external apparatus, etc. (step S12).

When the size of the paper P has not been confirmed (step S12; N), the control section 6 judges again whether or not the size of the paper P has been confirmed.

When the size of the paper P has been confirmed (step S12; Y), the control section 6 performs the paper feeding tray selecting processing (step S13).

Incidentally, the paper feeding tray selecting processing performed in step S13 is similar to the paper feeding tray selecting processing shown in FIG. 5, therefore, the description is omitted here.

The control section 6 judges whether or not there is an available paper feeding tray based on the available paper feeding tray presence information (step S14).

When there is no available paper feeding tray (step S14; N), the control section 6 advances the processing to step S16.

When there is an available paper feeding tray (step S14; Y), the control section 6 starts the image forming processing (step S15).

The control section 6 judges whether or not the image forming processing has finished (step S16).

When the image forming processing has not finished (step S16; N), the control section 6 advances to step S13.

When the image forming processing has finished (step S16; Y), the image forming processing when printing ends.

Next, the operation of the finishing processing when the finishing processing is included in the image forming processing (see FIG. 4; step S6, FIG. 6; step S15) is described.

First, a, case where the finishing processing is a punching processing is described with reference to FIG. 7 to FIG. 15.

Figure 7:
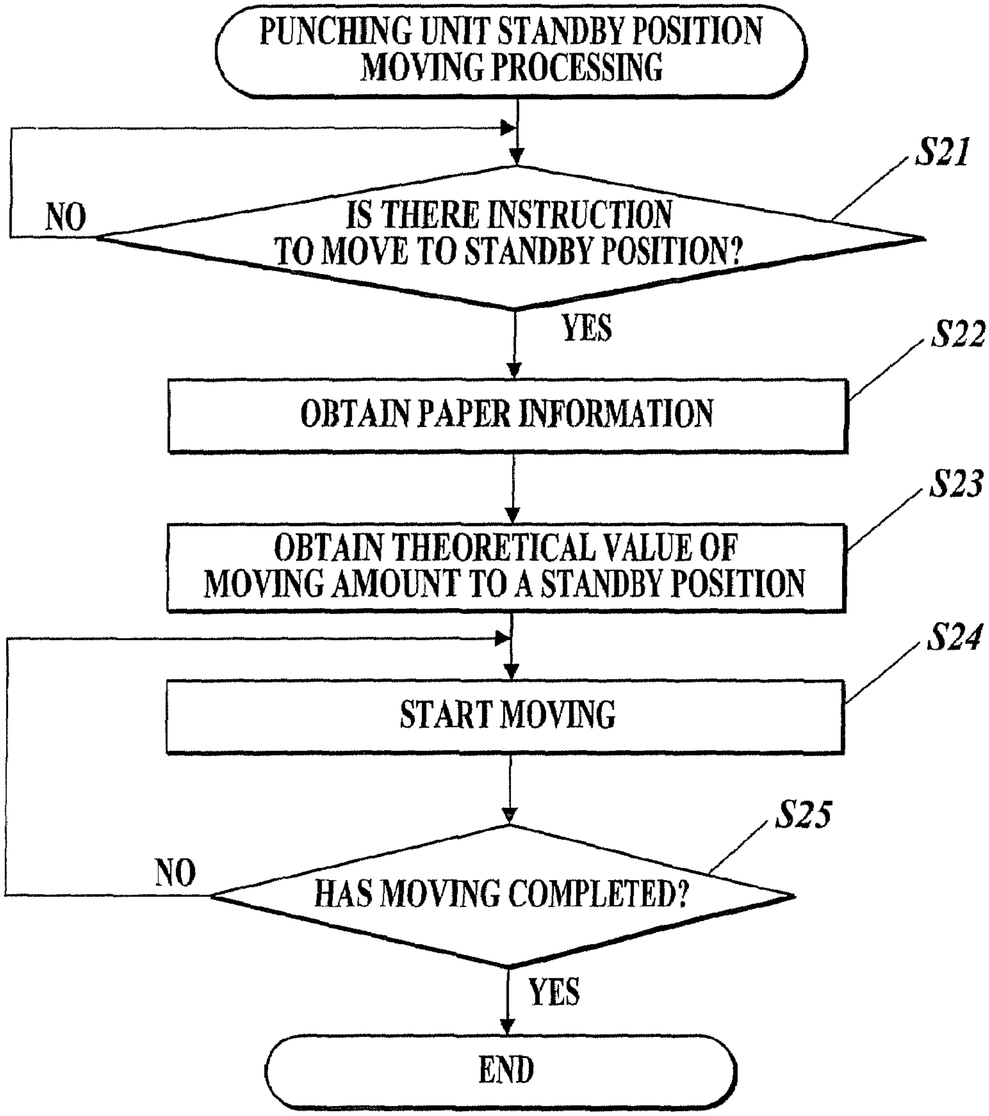
FIG. 7 is a flow diagram showing a punching unit standby position moving processing.

FIG. 7 is a diagram showing a punching unit standby position moving processing.

The punching unit standby position moving processing performs processing of moving in advance near a punching position the punching unit to open a punched hole.

The finishing processing control section 26 judges whether or not there is an instruction to move a standby position of the punching unit (step S21).

When there is no standby position moving instruction (step S21; N), the finishing processing control section 26 standbys until there is a, moving instruction.

When there is a standby position moving instruction (step S21; Y), the finishing processing control section 26 obtains paper information from the image forming apparatus 10 (step S22).

The finishing processing control section 26 obtains the theoretical value of moving amount to the standby position based on the information of the paper size included in the obtained paper information (step S23), and moves the punching unit in the amount of the obtained theoretical value of moving amount (step S24).

Incidentally, the theoretical value of the moving amount to the standby position is, specifically, a moving distance [mm] from an edge face of the paper P. Also, the information of the theoretical value of the moving amount to the standby position is stored in advance in the storage section 27 corresponding to the information of the paper size.

FIG. 8 is a table T1 showing the theoretical value of the moving amount to the standby position and the paper size corresponded.

According to the table T1, for example, when the paper size is "5.5×8.5 S", the theoretical value of the moving amount is 10.5 [mm]. Therefore, the finishing processing control section 26 moves the punching unit in advance in the amount of 10.5 [mm] from the edge face of the paper P.

Incidentally, the position where the punching unit actually opens the punched hole is a position where a later described adjustment amount is increased or decreased from the theoretical value of the moving amount.

Returning to FIG. 7, the finishing processing control section 26 judges whether or not the moving to the standby position has completed (step S25).

When the moving has not completed (step S25; N), the finishing processing control section 26 continues the moving processing of the punching unit to the standby position.

When the moving has completed (step S25; Y), the finishing processing control section 26 ends the punching unit standby position moving processing.

Figure 9:
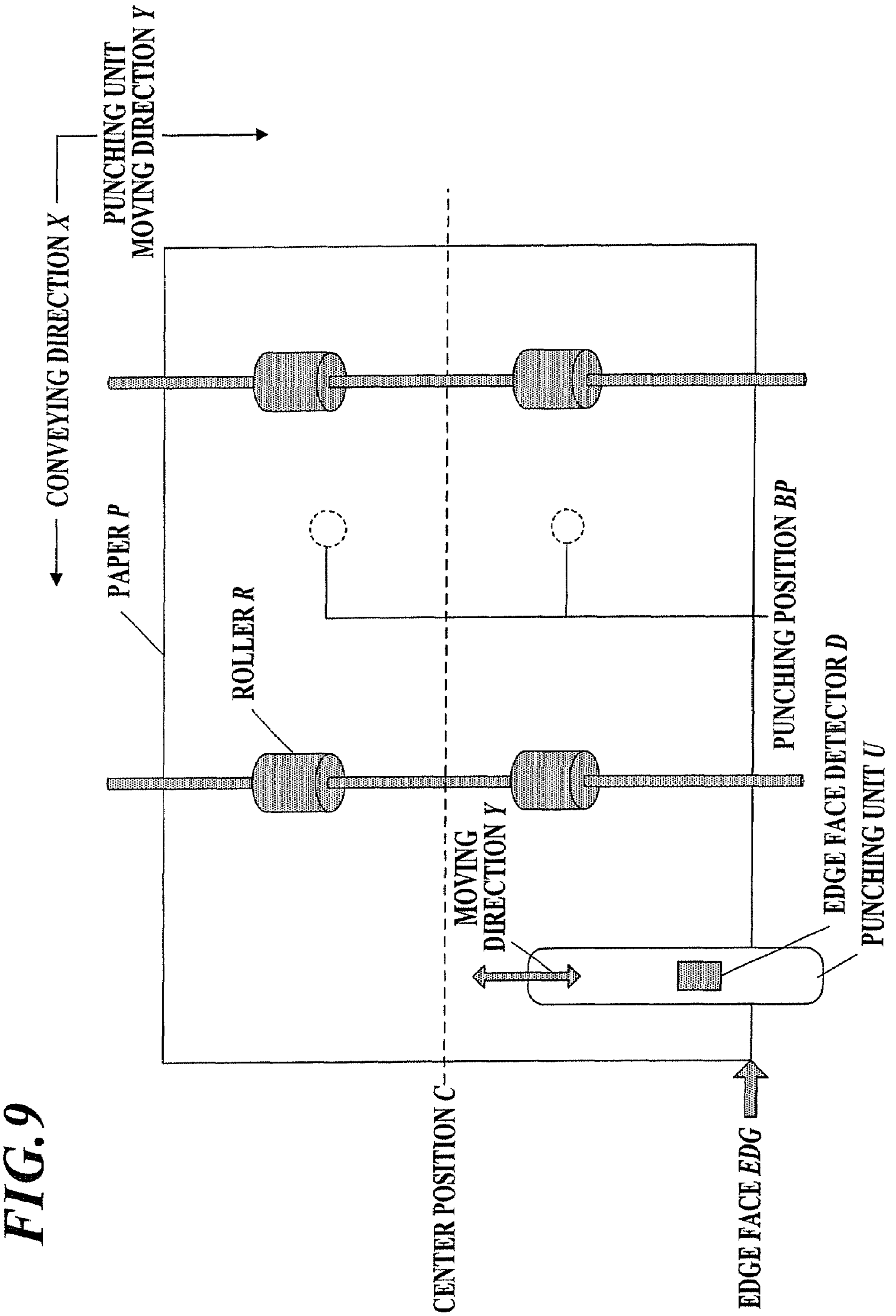
FIG. 9 is a conceptual diagram explaining a punching unit standby position moving processing.

FIG. 9 is a conceptual diagram explaining the punching unit standby position moving processing.

The conceptual diagram shown in FIG. 9 is a diagram showing the front face (or rear face) of the paper P looking down from above. The paper P is conveyed in a direction of a conveying direction X by a roller R.

The punching unit U includes an edge face detector D and the edge face detector D detects the edge face EDG of the paper P. The punching unit U moves in the moving direction Y starting from the edge face EDG in the amount of the theoretical value of the moving amount (see FIG. 8) obtained from the table T1 and standbys before the conveying of the paper P is completed.

The punching positions BP to be punched by the punching unit U in the standby position are theoretically positions symmetrical with respect to a line of a center position C.

Figure 10A:
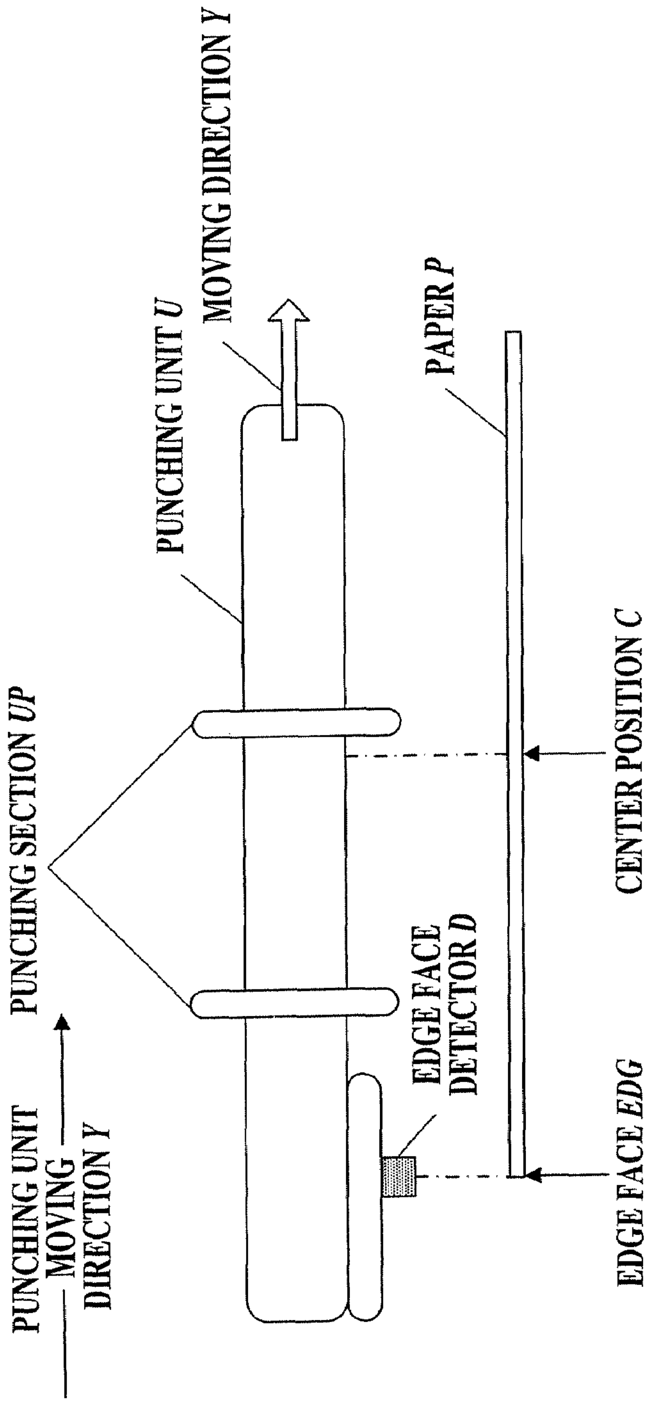
FIG. 10A is a conceptual diagram explaining the punching unit standby position moving processing.
Figure 10B:
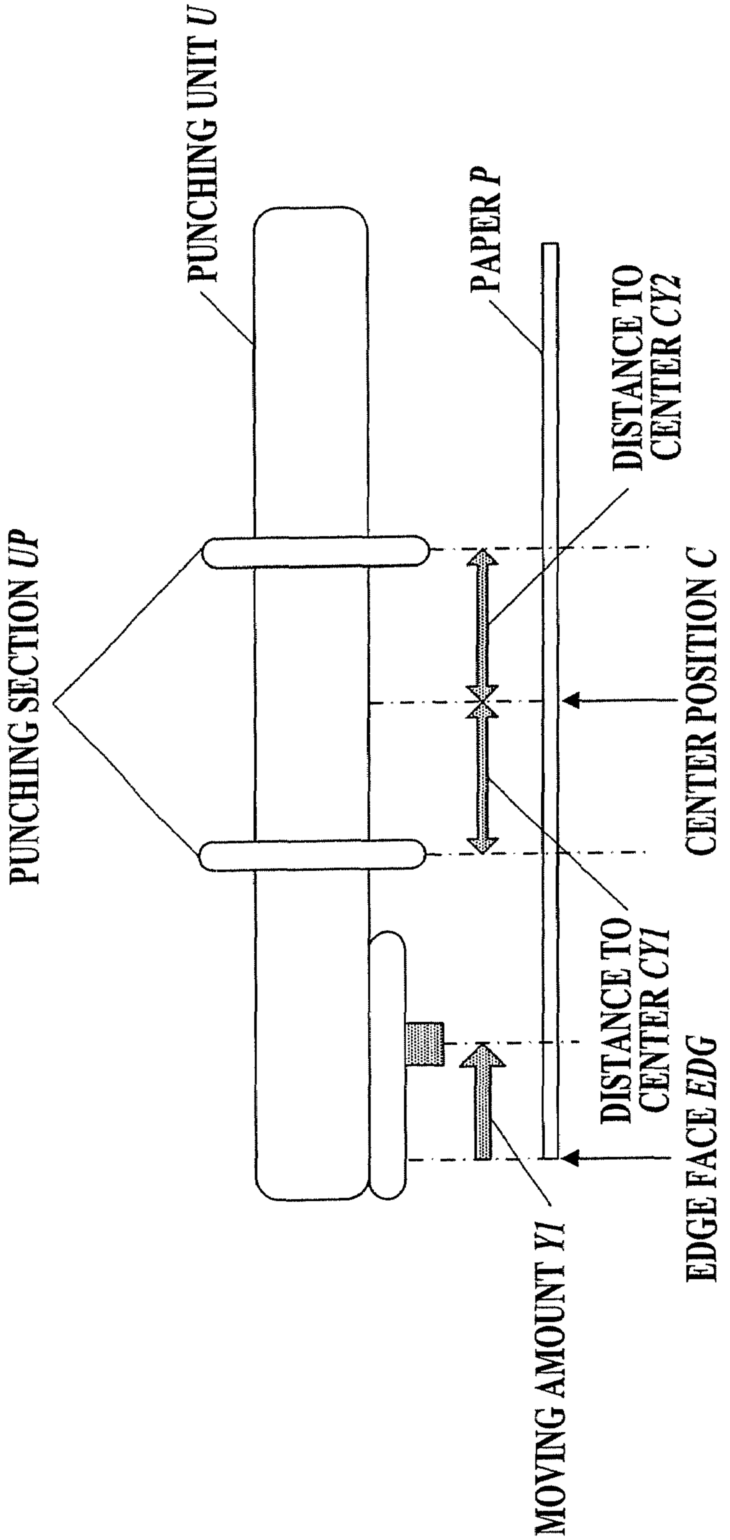
FIG. 10B is a conceptual diagram explaining the punching unit standby position moving processing.

FIG. 10A and FIG. 10B are each a conceptual diagram explaining the punching unit standby position moving processing viewed from an angle different from FIG. 9.

The conceptual diagrams shown in FIG. 10A and FIG. 10B are diagrams viewed from a horizontal direction with respect to the front face (or rear face) of the paper P and are diagrams viewed toward a direction of the conveying direction X of the paper P.

The conceptual diagram shown in FIG. 10A is a diagram showing a status of the punching unit U before moving.

The punching unit U is set by the edge face detector D so that the edge face detector D is in the position above the edge face EDG of the paper P.

The conceptual diagram shown in FIG. 10B is a diagram showing a status of the punching unit U after moving.

The punching unit U moves in the amount so that the edge face detector D is a theoretical value of the moving amount Y1 from the edge face EDG.

The punching section UP is included in the punching unit U and is the section to open a punched hole on the paper P. The distance between the position of each of the two punching sections UP after moving and the center position C is theoretically the same distance (distance to center CY1=distance to center CY2).

Figure 11:
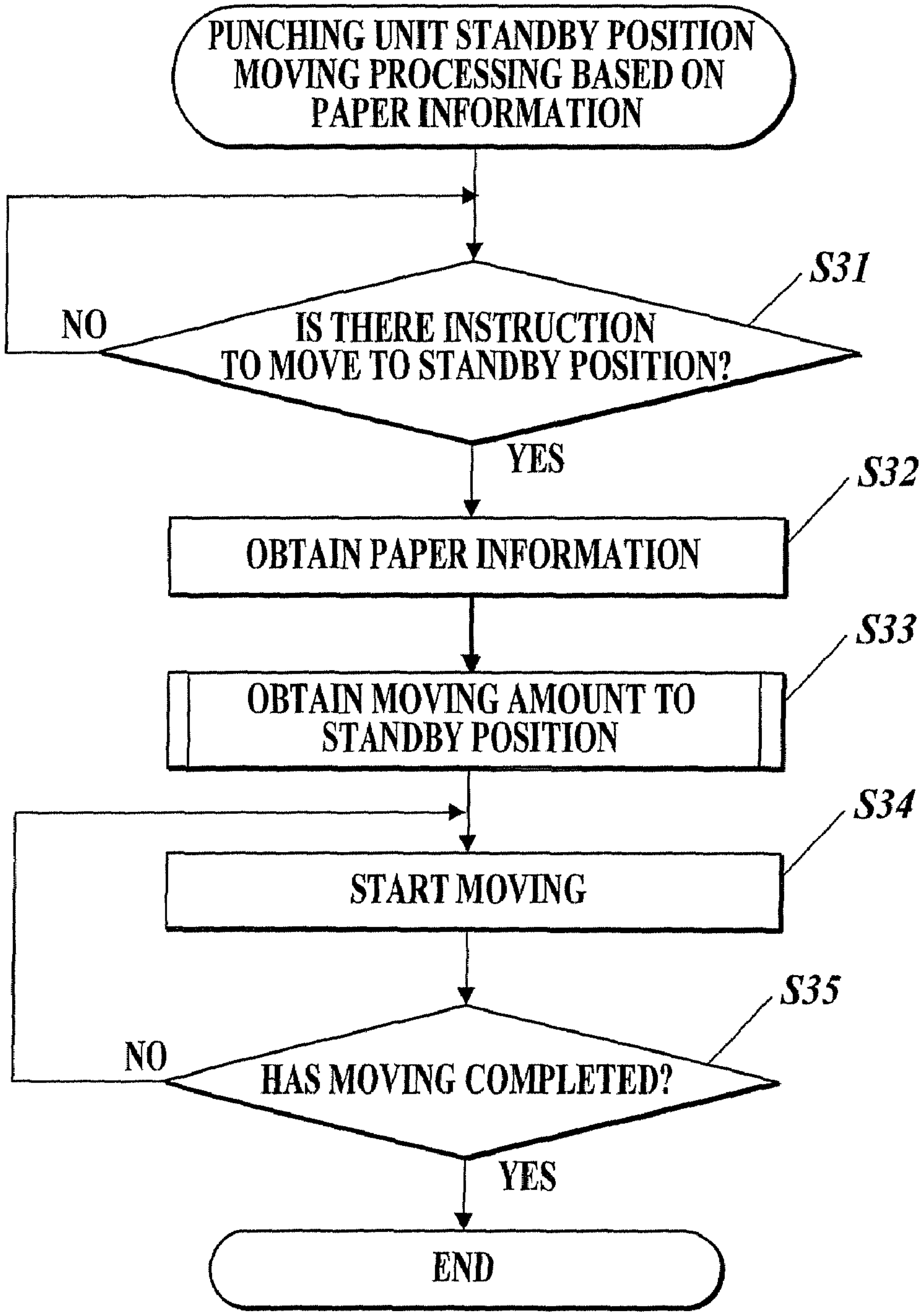
FIG. 11 is a flow diagram showing a punching unit standby position moving processing based on paper information.

FIG. 11 is a diagram showing the punching unit standby position moving processing based on the paper information.

Incidentally, step S31 to S32 is similar to step S21 to S22 shown in FIG. 7, and thus the description is omitted here.

The finishing processing control section 26 obtains a moving amount to the standby position based on the obtained paper size information (step S33).

Figure 12:
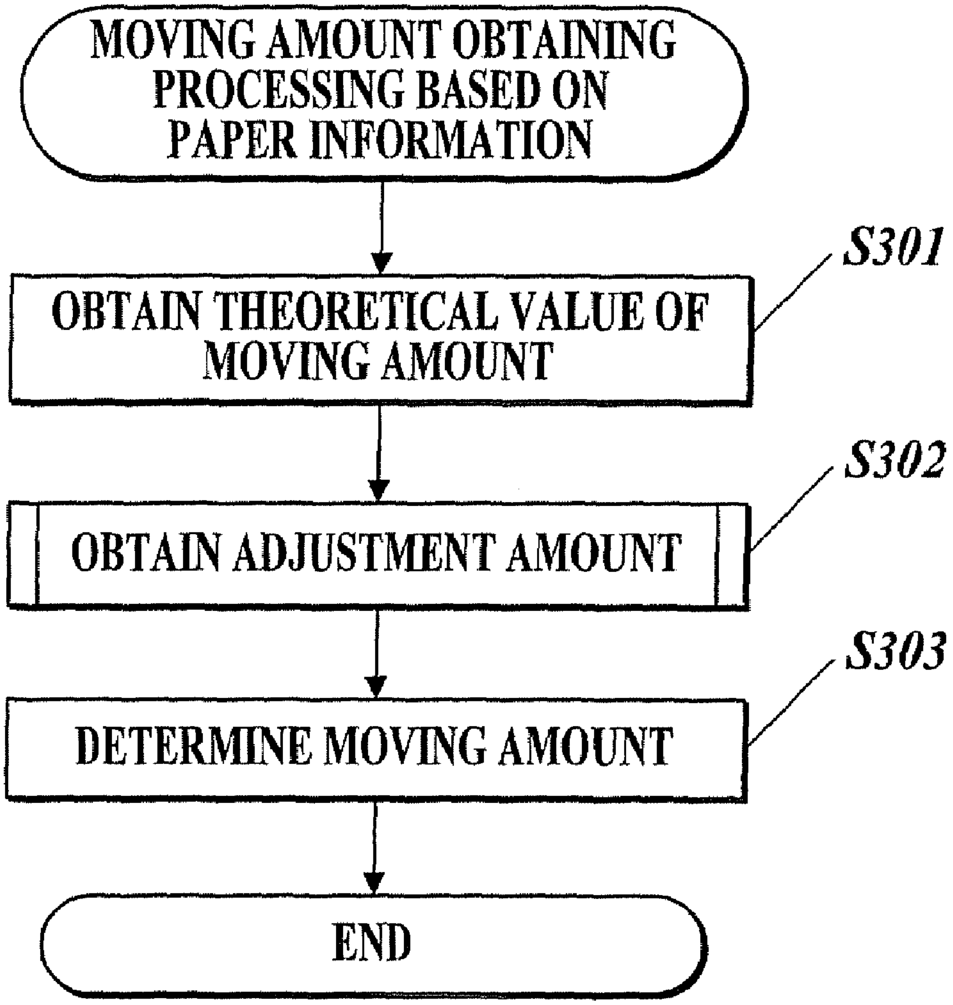
FIG. 12 is a flow diagram showing a moving amount obtaining processing based on the paper information.

FIG. 12 is a diagram showing the moving amount obtaining processing based on the paper information.

The finishing processing control section 26 obtains the theoretical value of the moving amount from the table T1 (see FIG. 8) stored in the storage section 27 (step S301) and further obtains the adjustment amount (step S302).

Figure 13:
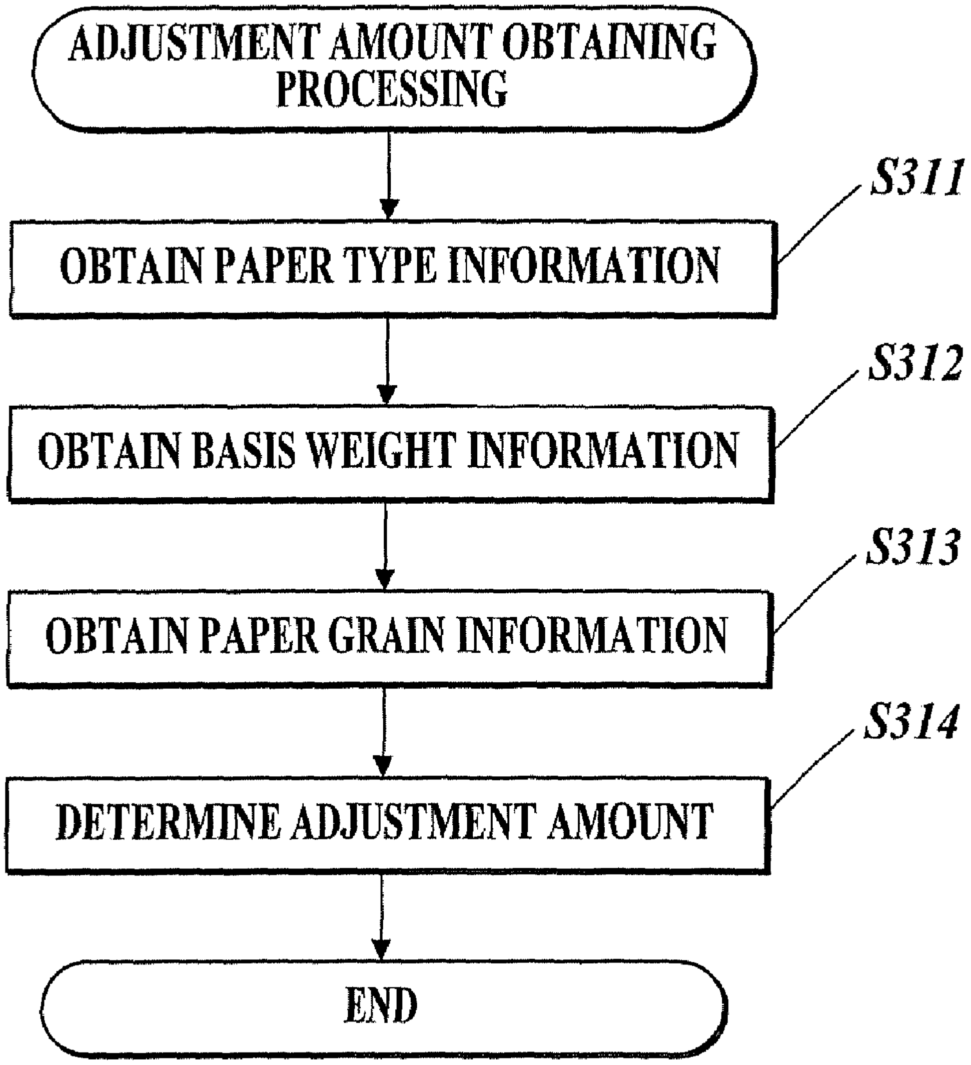
FIG. 13 is a flow diagram showing an adjustment amount obtaining processing.

FIG. 13 is a diagram showing an adjustment amount obtaining processing.

The finishing processing control section 26 obtains the paper information (see FIG. 2) and obtains the paper type information, basis weight information and paper grain information of the paper P where the punched hole is opened (step S311, S312 and S313).

The finishing processing control section 26 determines the adjustment amount based on the paper type information, basis weight information and paper grain information (step S314) and the adjustment amount obtaining processing ends.

Incidentally, the information of the adjustment amount is stored in advance in the storage section 27 corresponding to the paper type information, basis weight information and paper grain information.

FIG. 14 is a table T2 showing the adjustment amount and the paper type information, basis weight information and paper grain information corresponded respectively.

According to the table T2, for example, when the paper type is plain paper, the basis weight is 70 [g/m$^2$], and the paper grain is long grain, the adjustment amount is +2.0 [mm].

Returning to FIG. 12, the finishing processing control section 26 determines the moving amount based on the paper information by adding the adjustment amount obtained in step S302 to the theoretical value of the moving amount obtained in step S301 (step S303) and ends the moving amount obtaining processing based on the paper information.

Returning to FIG. 11, the finishing processing control section 26 moves the punching unit U in the amount of the moving amount obtained in step S33 (step S34) and judges whether or not the moving has completed (step S35).

When the moving has not completed (step S35; N), the finishing processing control section 26 moves the punching unit U further to the predetermined position.

When the moving has completed (step S35; Y), the finishing processing control section 26 ends the punching unit standby position moving processing based on the paper information.

Figure 15:
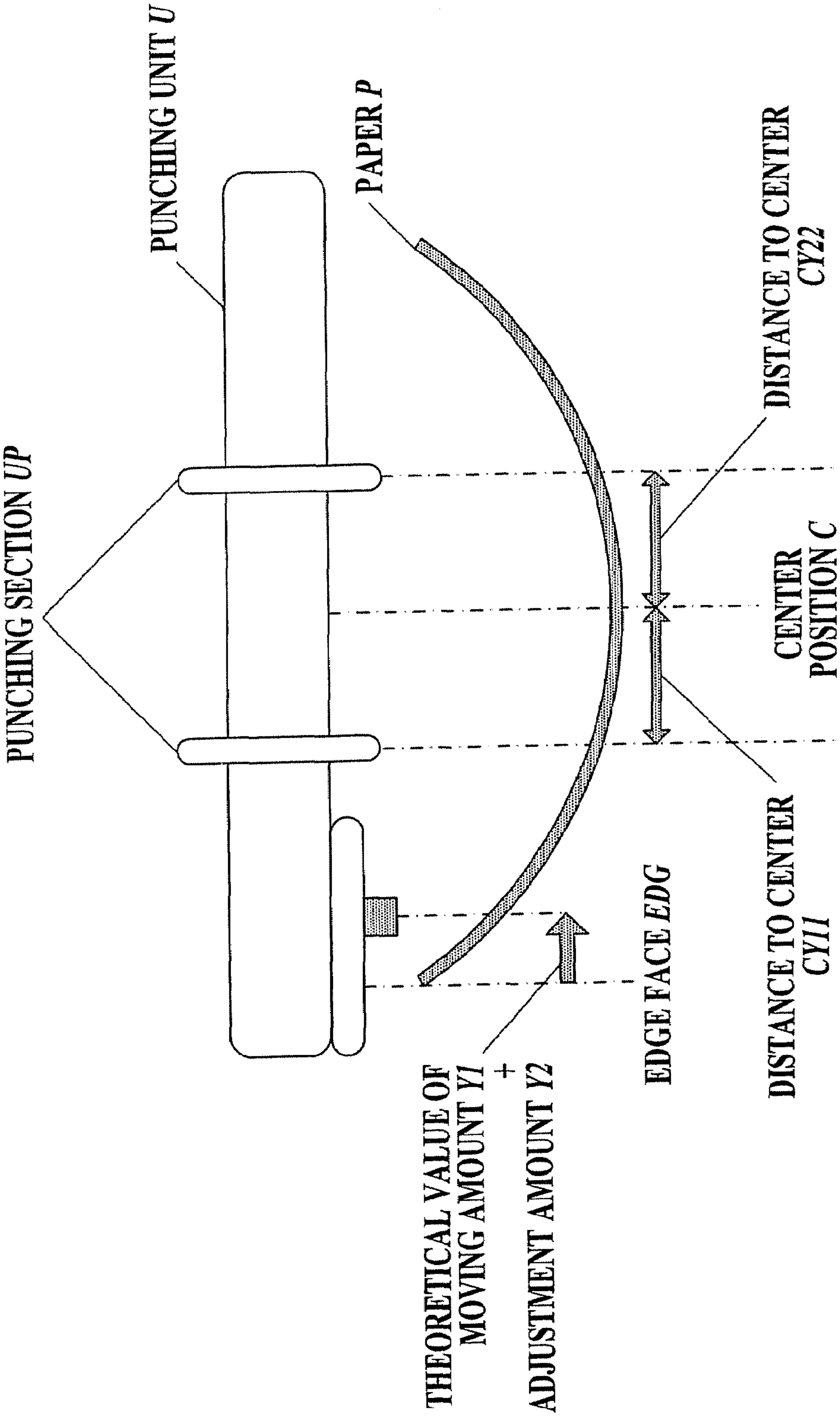
FIG. 15 is a conceptual diagram explaining a punching unit standby position moving processing based on the paper information.

FIG. 15 is a conceptual diagram explaining the punching unit standby position moving processing based on the paper information. The conceptual diagram shown in FIG. 15 is a diagram viewed from a horizontal direction with respect to the front face (or rear face) of the paper P and is a diagram viewed toward a direction of the conveying direction X of the paper P. Also, the conceptual diagram shown in FIG. 15 is a diagram showing a status of the punching unit U after moving based on the paper information.

As shown in FIG. 15, actually, the paper P is conveyed curled to some degree. Incidentally, an amount of curl is different depending on the paper grain, paper type, etc. Therefore, when the punching unit U is moved in the amount of the theoretical value of the moving amount Y1, the distance between each of the positions of the two punching sections UP and the center position C is not the same distance.

In the present embodiment, by setting the moving amount of the punching unit U to theoretical value of the moving amount Y1+adjustment amount Y2, the punching unit U moves to a suitable position (distance to center CY11=distance to center CY22) and standbys.

A case where the finishing processing is folding processing is described with reference to FIG. 16 to FIG. 19.

Figure 16:
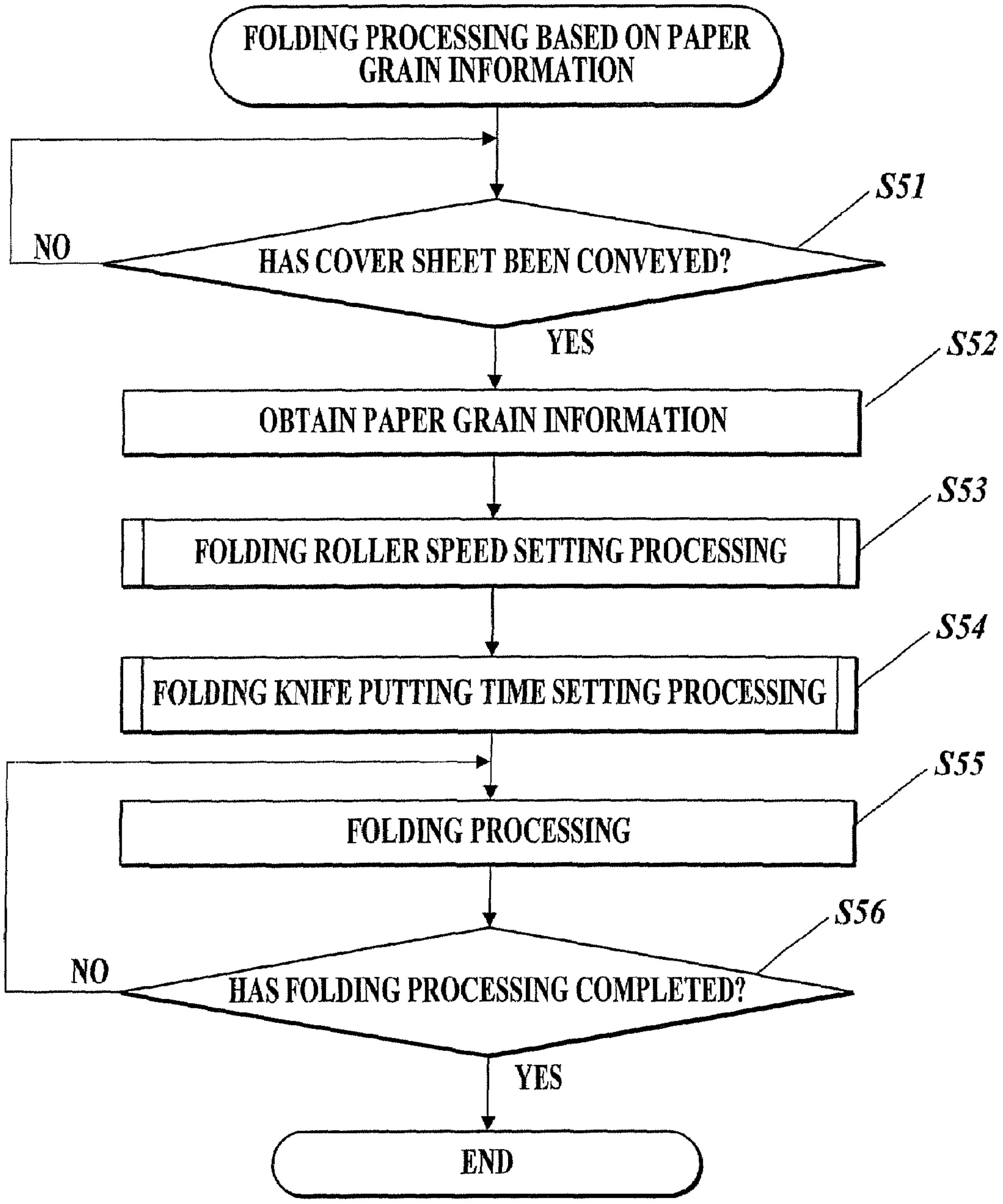
FIG. 16 is a flow diagram showing a folding processing based on paper grain information.

FIG. 16 is a diagram showing the folding processing based on the paper grain information.

The finishing processing control section 26 judges whether or not paper for the cover (hereinafter referred to as "cover sheet") has been conveyed from the image forming apparatus 10 (step S51).

When the cover sheet has not been conveyed (step S51; N), the finishing processing control section 26 standbys until the cover sheet is conveyed.

When the cover sheet has been conveyed (step S51; Y), the finishing processing control section 26 obtains the paper grain information (step S52).

The finishing processing control section 26 performs a folding roller speed setting processing based on the obtained paper grain information (step S53).

Figure 17:
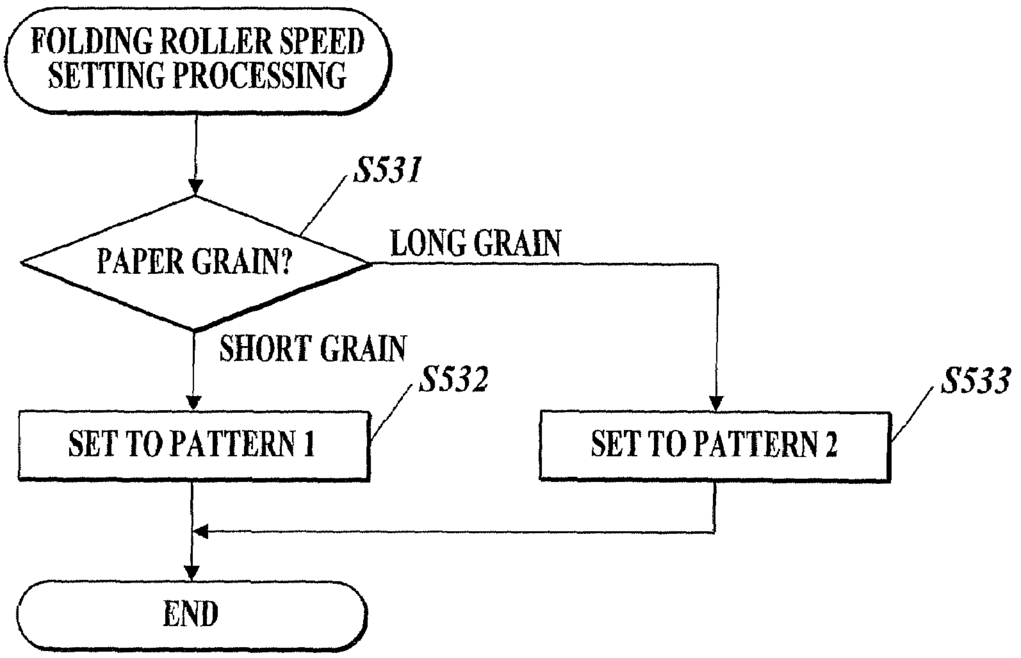
FIG. 17 is a flow diagram showing a folding roller speed setting processing.

FIG. 17 is a diagram showing the folding roller speed setting processing.

The finishing processing control section 26 judges whether the paper grain of the conveyed cover sheet is long grain or short grain based on the paper grain information (step S531).

When the paper grain is short grain (step S531; short grain), the finishing processing control section 26 sets the rotation speed of the folding roller to pattern 1 (step S532) and the folding roller speed setting processing ends.

When the paper grain is long grain (step S531; long grain), the finishing processing control section 26 sets the rotation speed of the folding roller to pattern 2 (step S533) and the folding roller speed setting processing ends.

FIG. 18 is a table T3 showing the paper grain and the folding roller rotation speed corresponded.

According to the table T3, when the paper grain of the paper P is short grain, the rotation speed of the folding roller is set to pattern 1. In the pattern 1, the rotation speed of the folding roller switches from 400 [rpm] to 1000 [rpm]. Also, in the pattern 1, a later described folding knife putting time is set to 500 [ms].

When the paper grain of the paper P is long grain, the rotation speed of the folding roller is set to pattern 2. In the pattern 2, the rotation speed of the folding roller switches in phases from 200 [rpm], 400 [rpm] to 1000 [rpm]. Also, in the pattern 2, the later described folding knife putting time is set to 800 [ms].

After the folding roller speed setting processing is performed, the finishing processing control section 26 performs a folding knife putting time setting processing (step S54).

Figure 19:
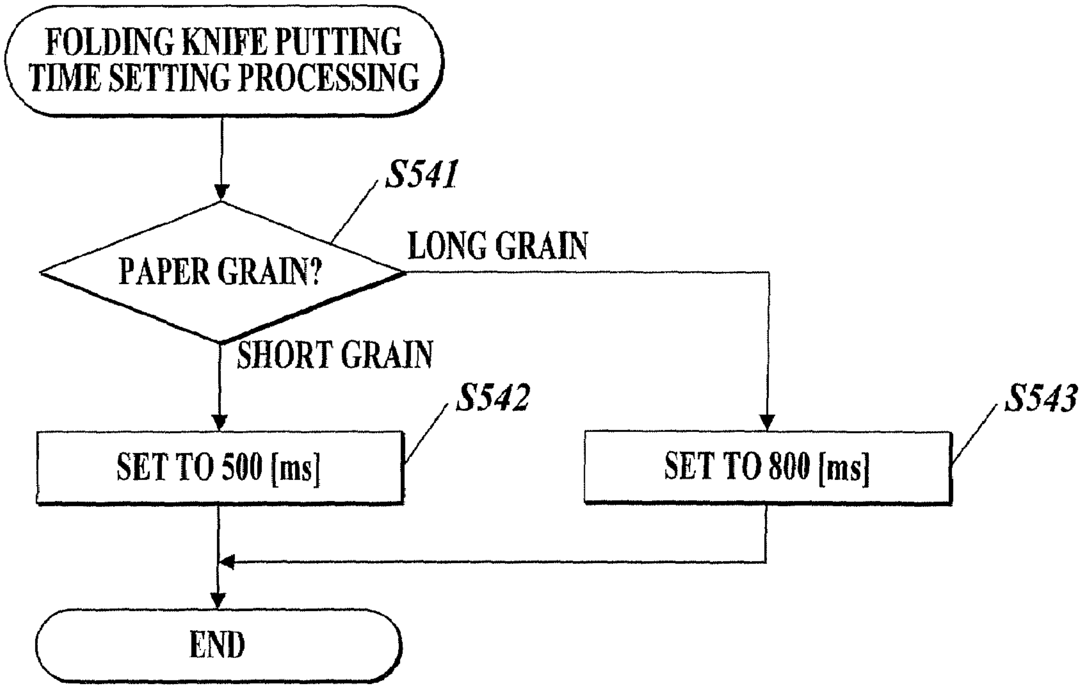
FIG. 19 is a flow diagram showing a folding knife putting time setting processing.

FIG. 19 is a diagram showing the folding knife putting time setting processing.

The finishing processing control section 26 judges whether the paper grain of the conveyed cover sheet is long grain or short grain based on the paper grain information (step S541).

When the paper grain is short grain (step S541; short grain), the finishing processing control section 26 refers to the table T3, sets the folding knife putting time to 500 [ms] (step S542) and ends the folding knife putting time setting processing.

When the paper grain is long grain (step S541; long grain), the finishing processing control section 26 refers to the table T3, sets the folding knife putting time to 800 [ms] (step S543) and ends the folding knife putting time setting processing.

The finishing processing control section 26 performs the folding processing (step S55) according to the folding roller speed (step S53) and folding knife putting time (step S54) which were set based on the paper grain information.

The finishing processing control section 26 judges whether or not the folding processing has completed (step S56).

When the folding processing has not completed (step S56; N), the finishing processing control section 26 performs the folding processing until the processing is completed.

When the folding processing has completed (step S56; Y), the finishing processing control section 26 finishes the folding processing.

A case where finishing processing is a paste applying processing is described with reference to FIG. 20 to FIG. 23.

Figure 20:
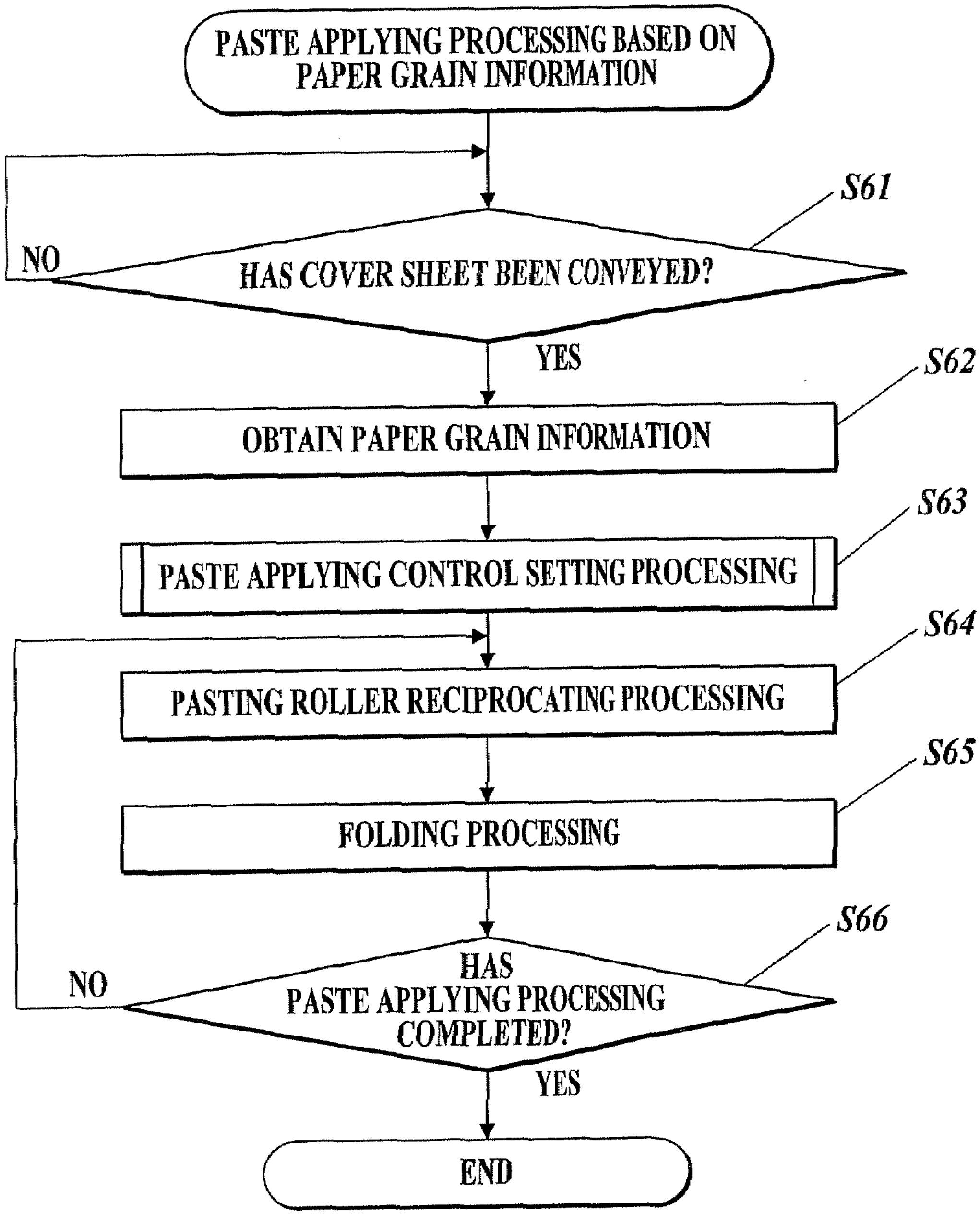
FIG. 20 is a flow diagram showing a paste applying processing based on paper grain information.

FIG. 20 is a diagram showing the paste applying processing based on the paper grain information.

The finishing processing control section 26 judges whether or not the cover sheet is conveyed from the image forming apparatus 10 (step S61).

When the cover sheet is not conveyed (step S61; N), the finishing processing control section 26 standbys until the cover sheet is conveyed.

When the cover sheet is conveyed (step S61; Y), the finishing processing control section 26 obtains the paper grain information of the conveyed cover sheet (step S62).

The finishing processing control section 26 performs a paste applying control setting processing based on the obtained paper grain information (step S63).

Figure 21:
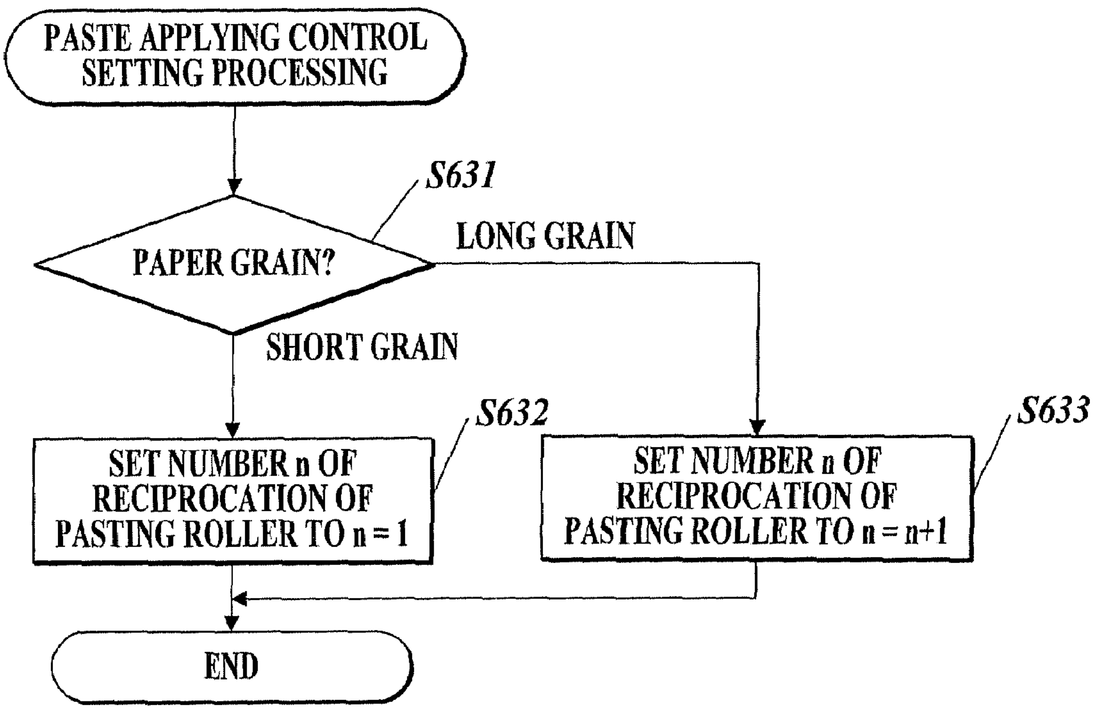
FIG. 21 is a flow diagram showing a paste applying control setting processing.

FIG. 21 is a diagram showing the paste applying control setting processing.

The finishing processing control section 26 judges whether the paper grain of the conveyed cover sheet is long grain or short grain based on the paper grain information (step S631).

When the paper grain is short grain (step S631; short grain), the finishing processing control section 26 sets the number n of reciprocation of the pasting roller to n=1 (step S632), and ends the paste applying control setting processing.

When the paper grain is long grain (step S631; long grain), the finishing processing control section 26 sets the number n of reciprocation of the pasting roller to n=n+1 (step S633), and ends the paste applying control setting processing.

FIG. 22 is a table T4 showing the paper grain and the number of times the paste is applied corresponded.

When the paper grain of the cover sheet is short grain, the number of times the paste is applied is set to one time. In other words, the number n of reciprocation of the pasting roller is set to n=1.

When the paper grain of the cover sheet is long grain, the number of times the paste is applied is set to two times. In other words, the number n of reciprocation of the pasting roller is set to n=2.

Figure 23A:
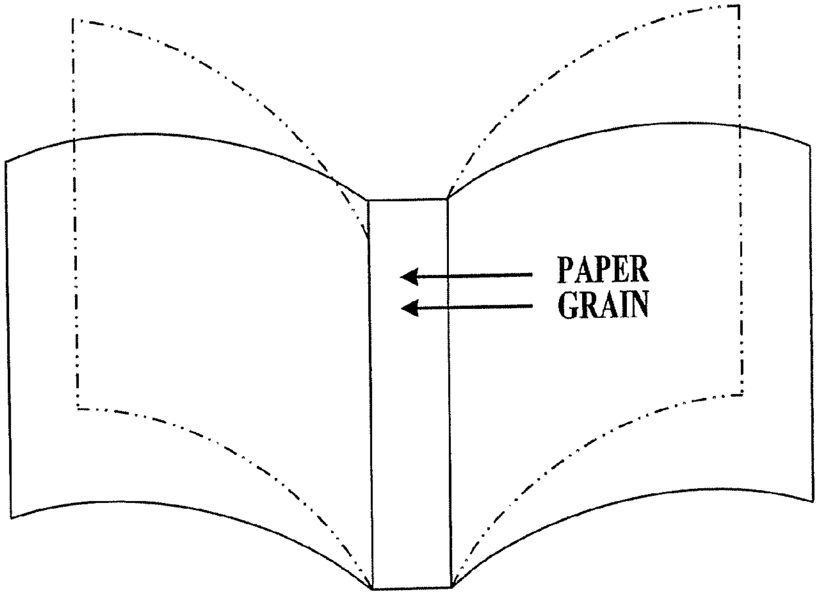
FIG. 23A is a diagram explaining a relation between a paper grain of a cover sheet and pasting.
Figure 23B:
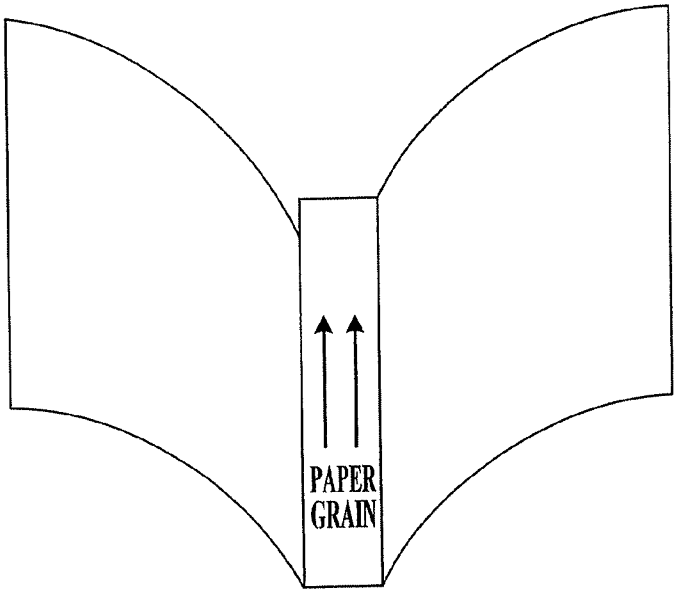
FIG. 23B is a diagram explaining a relation between a paper grain of a cover sheet and pasting.

FIG. 23A and FIG. 23B are diagrams explaining a relation between the paper grain of the cover sheet and pasting.

FIG. 23A is a diagram showing when the paper grain of the cover sheet is long grain. Since the folding direction is perpendicular to the paper grain, the folding is poor and the pasting is also poor.

FIG. 23B is a diagram showing when the paper grain of the cover sheet is short grain. Since the folding direction is parallel to the paper grain, the accuracy of folding is enhanced and pasting is easier.

The finishing processing control section 26 performs the processing of reciprocating the pasting roller the number of times as the number of reciprocation of the pasting roller set based on the paper grain information (step S64) and then performs the folding processing (step S65).

The finishing processing control section 26 judges whether or not the paste applying processing has completed (step S66).

When the processing has not completed (step S66; N), the finishing processing control section 26 advances the processing to step S64 and continues the reciprocating processing of the pasting roller and the folding processing.

When the processing has completed (step S65; Y), the finishing processing control section 26 ends the paste applying processing.

A case where the finishing processing is cutting processing is described with reference to FIG. 24 and FIG. 25.

Figure 24:
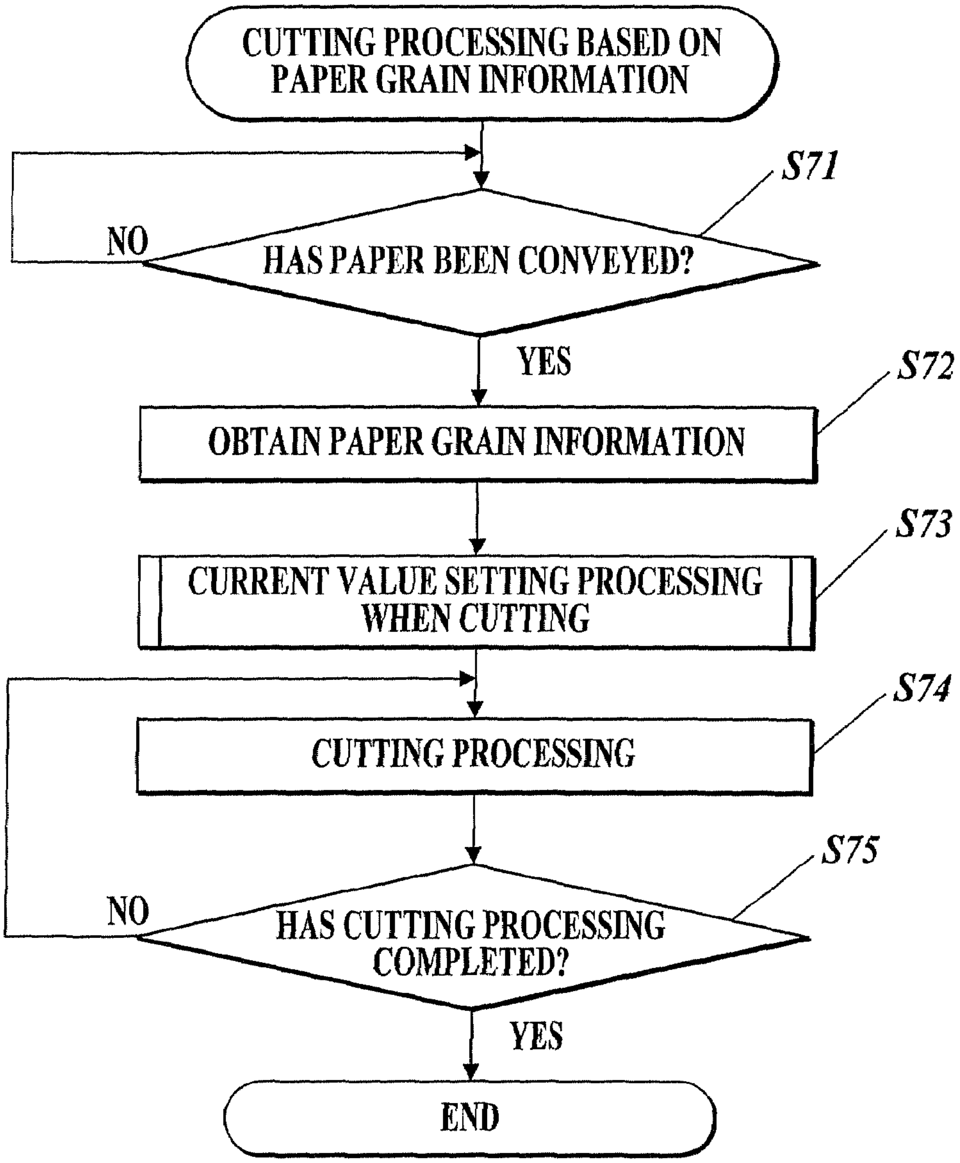
FIG. 24 is a flow diagram showing a cutting processing based on the paper grain information.

FIG. 24 is a diagram showing cutting processing based on the paper grain information.

The finishing processing control section 26 judges whether or not the paper P has been conveyed from the image forming apparatus 10 (step S71).

When the paper has not been conveyed (step S71; N), the finishing processing control section 26 standbys until the paper is conveyed.

When the paper has been conveyed (step S71; Y), the finishing processing control section 26 obtains the paper grain information of the conveyed paper P (step S72).

The finishing processing control section 26 performs a current value setting processing when cutting based on the obtained paper grain information (step S73).

Figure 25:
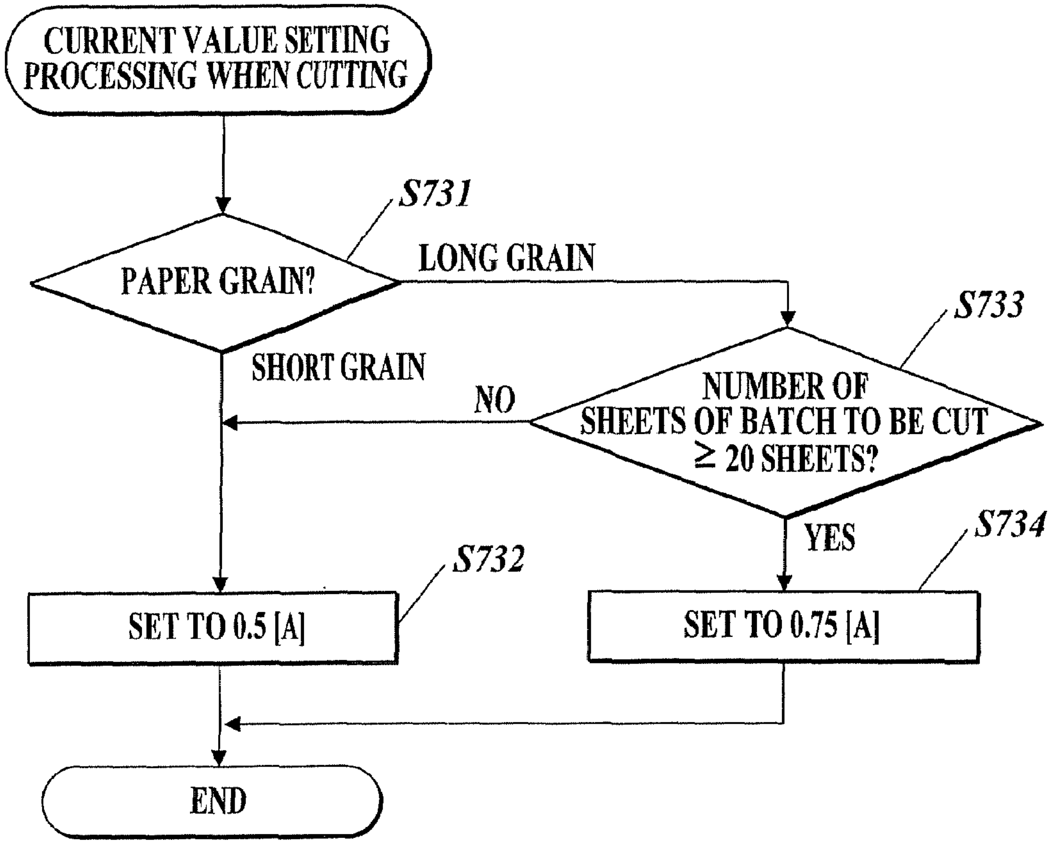
FIG. 25 is a flow diagram showing current value setting processing when cutting.

FIG. 25 is a diagram showing the current value setting processing when cutting.

The finishing processing control section 26 judges whether the paper grain of the conveyed paper P is long grain or short grain based on the paper grain information (step S731).

When the paper grain is short grain (step S731; short grain), the finishing processing control section 26 sets the current value when cutting to 0.5 [A] (step S732) and ends the current value setting processing when cutting.

When the paper grain is long grain (step S731; long grain), the finishing processing control section 26 judges whether or not the number of sheets of the batch to be cut which is the object of cutting is 20 sheets or more (step S733).

When the number of sheets of the batch to be cut is not 20 sheets or more (step S733; N), the finishing processing control section 26 advances the processing to step S732.

When the number of sheets of the batch to be cut is 20 sheets or more (step S733; Y), the finishing processing control section 26 sets the current value when cutting to 0.75 [A] (step S734), and ends the current value setting processing when cutting.

FIG. 26 is a table T5 showing the paper grain and the current value when cutting corresponded.

When the paper grain of the paper P is short grain, the current value when cutting is set to 0.5 [A]. Also, when the paper grain of the paper P is long grain, the current value when cutting is set to 0.5 [A] or 0.75 [A].

The finishing processing control section 26 performs cutting processing on the conveyed paper P with the current value when cutting set based on the paper grain of the paper P and the number of sheets of the batch to be cut (step S74).

The finishing processing control section 26 judges whether or not the cutting processing has completed (step S75).

When the finishing processing has not completed (step S75; N), the finishing processing control section 26 advances the processing to step S74 and continues the cutting processing.

When the finishing processing has completed (step S75; Y), the finishing processing control section 26 ends the cutting processing based on the paper grain information.

As described above, according to the present embodiment, the adjustment amount used in the finishing processing can be switched based on the information of the paper grain of the paper and the finishing processing can be performed using the switched adjustment amount. Therefore, suitable finishing processing is performed according to the information of the paper grain of the paper, and high quality finishing processing resulting product can be generated.

According to an aspect of the preferred embodiments of the present invention, there is provided a finisher to perform finishing processing on a paper ejected from an image forming apparatus, including:

a control section to switch an adjustment amount to be used in the finishing processing based on information of paper grain of the paper.

According to the aspect, the various adjustment amounts used in finishing processing can be switched based on the information of the paper grain of the paper set for each paper feeding tray 4. Consequently, high quality finishing processing resulting product can be generated.

Preferably, in the finisher, the control section switches the adjustment amount by referring to a table where the information of the paper grain of the paper and the adjustment amount to be used in the finishing processing are corresponded in advance.

Consequently, since the various adjustment amounts used when finishing processing is performed is stored in a table corresponding to the information of the paper grain of the paper, suitable finishing processing can be performed by referring to the various tables according to the content of the finishing processing. Incidentally, the various adjustment amounts can be calculated by computing based on the paper information including the paper grain information.

Preferably, in the finisher, the finishing processing includes at least one of a punching processing, folding processing, paste applying processing and cutting processing.

Preferably, in the finisher, the control section switches the adjustment amount to be used in the finishing processing according to a content of the finishing processing.

Preferably, in the finisher, when the finishing processing is a punching processing, the control section adjusts a position to be punched based on the information of the paper grain of the paper.

Preferably, in the finisher, when the finishing processing is a folding processing, the control section adjusts time necessary for folding processing based on the information of the paper grain of the paper.

Consequently, when the finishing processing is the folding processing, the speed of the folding roller and the folding knife putting time can be adjusted based on the paper information.

Preferably, in the finisher, when the finishing processing is a paste applying processing, the control section adjusts a number of times paste is applied based on the information of the paper grain of the paper.

Preferably, in the finisher, when the finishing processing is a cutting processing, the control section adjusts a current value when cutting based on the information of the paper grain of the paper.

According to another aspect of the preferred embodiments of the present invention, there is provided an image forming system including:

an image forming apparatus to form an image on paper; and a finisher to perform finishing processing on the paper ejected from the image forming apparatus, wherein the image forming apparatus includes an image forming section to form an image on the paper; and the finisher includes a control section to switch an adjustment amount to be used in the finishing processing according to a content of the finishing processing based on information of paper grain of the paper.

Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

The present U.S. patent application claims priority under the Paris Convention of Japanese Patent Application No. 2008-159002 filed on Jun. 18, 2008 to the Japanese Patent Office, which shall be a basis for correcting mistranslations.

What is claimed is:

1. A finisher to perform finishing processing on a paper ejected from an image forming apparatus, comprising:

a control section to switch an adjustment amount to be used in the finishing processing based on information of paper grain of the paper, wherein when the finishing processing is a punching processing, the control section adjusts a position to be punched based on the information of the paper grain of the paper.

2. A finisher to perform finishing processing on a paper ejected from an image forming apparatus, comprising:

a control section to switch an adjustment amount to be used in the finishing processing based on information of paper grain of the paper, wherein when the finishing processing is a folding processing, the control section adjusts time necessary for folding processing based on the information of the paper grain of the paper.

3. A finisher to perform finishing processing on a paper ejected from an image forming apparatus, comprising:

a control section to switch an adjustment amount to be used in the finishing processing based on information of paper grain of the paper, wherein when the finishing processing is a paste applying processing, the control section adjusts a number of times paste is applied based on the information of the paper grain of the paper.

4. A finisher to perform finishing processing on a paper ejected from an image forming apparatus, comprising:

a control section to switch an adjustment amount to be used in the finishing processing based on information of paper grain of the paper, wherein when the finishing processing is a cutting processing, the control section adjusts a current value when cutting based on the information of the paper grain of the paper.

5. An image forming system comprising:

an image forming apparatus to form an image on paper; and a finisher to perform finishing processing on the paper ejected from the image forming apparatus, wherein the image forming apparatus includes an image forming section to form an image on the paper;

the finisher includes a control section to switch an adjustment amount to be used in the finishing processing according to a content of the finishing processing based on information of paper grain of the paper; and when the finishing processing is a punching processing, the control section adjusts a position to be punched based on information of the paper grain of the paper.

6. An image forming system comprising:

an image forming apparatus to form an image on paper; and a finisher to perform finishing processing on the paper ejected from the image forming apparatus, wherein the image forming apparatus includes an image forming section to form an image on the paper;

the finisher includes a control section to switch an adjustment amount to be used in the finishing processing according to a content of the finishing processing based on information of paper grain of the paper; and when the finishing processing is a folding processing, the control section adjusts time necessary for folding processing based on the information of the paper grain of the paper.

7. An image forming system comprising:

an image forming apparatus to form an image on paper; and a finisher to perform finishing processing on the paper ejected from the image forming apparatus, wherein the image forming apparatus includes an image forming section to form an image on the paper;

the finisher includes a control section to switch an adjustment amount to be used in the finishing processing according to a content of the finishing processing based on information of paper grain of the paper; and when the finishing processing is a paste applying processing, the control section adjusts a number of times paste is applied based on the information of the paper grain of the paper.

8. An image forming system comprising:

an image forming apparatus to form an image on paper; and a finisher to perform finishing processing on the paper ejected from the image forming apparatus, wherein the image forming apparatus includes an image forming section to form an image on the paper;

the finisher includes a control section to switch an adjustment amount to be used in the finishing processing according to a content of the finishing processing based on information of paper grain of the paper; and when the finishing processing is a cutting processing, the control section adjusts a current value when cutting based on the information of the paper grain of the paper.

9. The finisher of claim 1, wherein the control section switches the adjustment amount by referring to a table where the information of the paper grain of the paper and the adjustment amount to be used in the finishing processing are associated with each other in advance.

10. The finisher of claim 2, wherein the control section switches the adjustment amount by referring to a table where the information of the paper grain of the paper and the adjustment amount to be used in the finishing processing are associated with each other in advance.

11. The finisher of claim 3, wherein the control section switches the adjustment amount by referring to a table where the information of the paper grain of the paper and the adjustment amount to be used in the finishing processing are associated with each other in advance.

12. The finisher of claim 4, wherein the control section switches the adjustment amount by referring to a table where the information of the paper grain of the paper and the adjustment amount to be used in the finishing processing are associated with each other in advance.

13. The image forming system of claim 5, wherein the control section switches the adjustment amount by referring to a table where the information of the paper grain of the paper and the adjustment amount to be used in the finishing processing are associated with each other in advance.

14. The image forming system of claim 6, wherein the control section switches the adjustment amount by referring to a table where the information of the paper grain of the paper and the adjustment amount to be used in the finishing processing are associated with each other in advance.

15. The image forming system of claim 7, wherein the control section switches the adjustment amount by referring to a table where the information of the paper grain of the paper and the adjustment amount to be used in the finishing processing are associated with each other in advance.

16. The image forming system of claim 8, wherein the control section switches the adjustment amount by referring to a table where the information of the paper grain of the paper and the adjustment amount to be used in the finishing processing are associated with each other in advance.

* * * * *